US012319450B2

(12) United States Patent
Goodwin et al.

(10) Patent No.: US 12,319,450 B2
(45) Date of Patent: Jun. 3, 2025

(54) FLUID MANIFOLD SYSTEMS AND METHODS OF MANUFACTURE

(71) Applicant: LIFE TECHNOLOGIES CORPORATION, Carlsbad, CA (US)

(72) Inventors: Michael E. Goodwin, Logan, UT (US); Jeremy K. Larsen, Providence, UT (US); Patrick L Draper, Smithfield, UT (US); Brandon M. Knudsen, Hyrum, UT (US)

(73) Assignee: Life Technologies Corporation, Carlsbad, CA (US)

( * ) Notice: Subject to any disclaimer, the term of this patent is extended or adjusted under 35 U.S.C. 154(b) by 0 days.

(21) Appl. No.: 18/189,994

(22) Filed: Mar. 24, 2023

(65) Prior Publication Data

US 2023/0234732 A1 Jul. 27, 2023

Related U.S. Application Data

(60) Division of application No. 17/481,605, filed on Sep. 22, 2021, now Pat. No. 11,639,240, which is a (Continued)

(51) Int. Cl.
*B65B 3/00* (2006.01)
*B65B 1/04* (2006.01)
(Continued)

(52) U.S. Cl.
CPC ................ *B65B 1/04* (2013.01); *B65B 3/003* (2013.01); *B65B 3/02* (2013.01); *B65B 3/04* (2013.01);
(Continued)

(58) Field of Classification Search
CPC ..... A61J 1/10; B65B 3/04; B65B 3/17; B65B 1/04
See application file for complete search history.

(56) References Cited

U.S. PATENT DOCUMENTS

| | | | | |
|---|---|---|---|---|
| 2,876,602 A | | 3/1959 | Ditlea | |
| 3,187,750 A | * | 6/1965 | Tenczar, Jr. ......... | A61M 1/0209 604/410 |

(Continued)

FOREIGN PATENT DOCUMENTS

| | | |
|---|---|---|
| EP | 0 476 194 A1 | 3/1992 |
| JP | H01-164142 U | 11/1989 |

(Continued)

OTHER PUBLICATIONS

International Search Report dated Jan. 2, 2013, issued in PCT Application No. PCT/US2012/046095, filed Jul. 10, 2012.

(Continued)

*Primary Examiner* — Andrew M Tecco

(57) ABSTRACT

A fluid manifold system includes a first manifold having portions of opposing flexible sheets welded together to form a fluid flow path therebetween, a fluid inlet communicating with the fluid flow path. The fluid flow path of the first manifold includes: a primary flow path communicating with the fluid inlet of the first manifold; and a plurality of spaced apart secondary flow paths that branch off of the primary flow path. Each secondary flow path has a first end communicating with the primary flow path and an opposing second end, each secondary flow path having a diameter that is smaller than a diameter of the primary flow path. The fluid manifold system also includes a plurality of tubular connectors with each tubular connector being secured to the first manifold at the second end of a corresponding one of the secondary flow paths.

18 Claims, 22 Drawing Sheets

Related U.S. Application Data continuation of application No. 16/385,775, filed on Apr. 16, 2019, now Pat. No. 11,148,836, which is a division of application No. 14/728,717, filed on Jun. 2, 2015, now Pat. No. 10,308,378, which is a continuation of application No. 14/131,872, filed as application No. PCT/US2012/046095 on Jul. 10, 2012, now Pat. No. 9,073,650.

(60) Provisional application No. 61/506,283, filed on Jul. 11, 2011.

(51) Int. Cl.

| | |
|---|---|
| ***B65B 3/02*** | (2006.01) |
| ***B65B 3/04*** | (2006.01) |
| ***B65B 51/02*** | (2006.01) |
| ***B65B 51/22*** | (2006.01) |
| *A61J 1/10* | (2006.01) |

(52) U.S. Cl.

CPC ............ *B65B 51/02* (2013.01); *B65B 51/225* (2013.01); *A61J 1/10* (2013.01)

(56) References Cited

U.S. PATENT DOCUMENTS

| | | | | | |
|---|---|---|---|---|---|
| 3,566,930 | A * | 3/1971 | Kirschner | A61L 2/00 | 604/80 |
| 3,968,195 | A * | 7/1976 | Bishop | B29C 65/103 | 156/304.6 |
| 4,694,959 | A | 9/1987 | Ausnit et al. | | |
| 4,754,786 | A * | 7/1988 | Roberts | A61L 2/18 | 141/286 |
| 4,856,261 | A * | 8/1989 | Hackett | B65B 3/04 | 53/469 |
| 4,964,261 | A | 10/1990 | Benn | | |
| 4,994,039 | A | 2/1991 | Mattson | | |
| 5,167,656 | A * | 12/1992 | Lynn | A61M 1/0209 | 600/580 |
| 5,600,938 | A * | 2/1997 | Trimble | B65B 51/00 | 53/138.4 |
| 5,701,937 | A * | 12/1997 | Bourboulou | A61J 3/002 | 141/10 |
| 6,083,587 | A * | 7/2000 | Smith | B29C 48/185 | 428/476.3 |
| 6,450,215 | B1 * | 9/2002 | Willemstyn | B65B 3/12 | 141/237 |
| 6,655,655 | B1 | 12/2003 | Matkovich et al. | | |
| 7,938,454 | B2 * | 5/2011 | Buchanan | B29C 66/5223 | 604/905 |
| 8,016,003 | B2 * | 9/2011 | Bullen | B65B 3/003 | 141/237 |
| 8,455,242 | B2 | 6/2013 | Staheli et al. | | |
| 9,365,304 | B2 * | 6/2016 | Mueller | F16K 15/04 | |
| 2003/0077466 | A1 | 4/2003 | Smith et al. | | |
| 2003/0230521 | A1 * | 12/2003 | Schick | B01D 61/145 | 210/90 |
| 2006/0196501 | A1 * | 9/2006 | Bibbo | C12M 23/14 | 128/200.23 |
| 2007/0186992 | A1 * | 8/2007 | Bullen | B65B 3/003 | 141/65 |
| 2008/0265561 | A1 * | 10/2008 | Buchanan | B29C 66/857 | 604/28 |
| 2009/0126515 | A1 | 5/2009 | Goodwin | | |
| 2011/0113900 | A1 | 5/2011 | Goodwin | | |
| 2013/0082410 | A1 | 4/2013 | Goodwin et al. | | |
| 2019/0241287 | A1 | 8/2019 | Goodwin et al. | | |
| 2022/0002007 | A1 | 1/2022 | Goodwin et al. | | |

FOREIGN PATENT DOCUMENTS

| | | | |
|---|---|---|---|
| JP | 2003-312731 | A | 11/2003 |
| JP | 2004-168368 | A | 6/2004 |
| JP | 2004-262530 | A | 9/2004 |
| WO | WO-2005/030586 | A1 | 4/2005 |
| WO | WO-2006/093572 | A2 | 9/2006 |

OTHER PUBLICATIONS

Written Opinion dated Jan. 2, 2013, issued in PCT Application No. PCT/US2012/046095, filed 10, 2012.

* cited by examiner

FLUID MANIFOLD SYSTEMS AND METHODS OF MANUFACTURE

CROSS-REFERENCE TO RELATED APPLICATIONS

This application is a divisional of U.S. application Ser. No. 17/481,605, filed Sep. 22, 2021, which is a continuation of U.S. application Ser. No. 16/385,775, filed Apr. 16, 2019, U.S. Pat. No. 11,148,836, which is a divisional of U.S. application Ser. No. 14/728,717, filed Jun. 2, 2015, U.S. Pat. No. 10,308,378, which is a continuation of U.S. application Ser. No. 14/131,872, filed Jan. 9, 2014, U.S. Pat. No. 9,073,650, which is a U.S. nationalization of PCT Application No. PCT/US2012/046095, filed Jul. 10, 2012, which claims the benefit of U.S. Provisional Application No. 61/506,283, filed Jul. 11, 2011, which are incorporated herein by specific reference.

BACKGROUND OF THE INVENTION

The Field of the Invention

The present invention relates to manifolds for dispensing fluids.

The Relevant Technology

During the manufacturing and processing of sterile liquid products by the biotechnology and pharmaceutical industries, a manifold is often used to simultaneously dispense the sterile liquid product from a storage container into a plurality of smaller containers, generally bags, that are then used for processing, testing or other purposes. Conventional manifolds are typically manufactured from a plurality of tube sections that are manually connected together using T's and other connectors. The plurality of bags are then manually connected to the assembled tubes. While such manifolds allow the liquid product to be successfully transferred between the storage container and the smaller containers, there are a number of shortcomings with such systems, especially with regards to sterile liquids.

Initially, the traditional manifolds are time-consuming and labor intensive to assemble. The tube assembly can also be unwieldy and difficult to work with. In addition, the large number of connections required by the conventional manifold creates an increased risk that a connection may fail, i.e., leak, thereby contaminating the sterile liquid being processed. Furthermore, because the manifolds are made from tube sections that are cut and pressed together, particulate matter from the cutting or assembling process can become trapped within the tubes. In turn, the unwanted particulate matter can become suspended within the fluid traveling through the tubes and be carried in the bags with the fluid. This results in unwanted particulate within the fluid.

In addition to housing particulate matter, the tubes are also occupied by a gas, such as air. As the fluid flows through the tubes to the containers, the fluid pushes the gas into the containers. This gas is unwanted as it occupies space that could be used for fluid and because the gas can have a negative influence on the fluids. Finally, because the tubes can have a fairly large passage extending therethrough, a significant amount of fluid can be retained within the tubes after the containers are filled. This fluid can be difficult to remove from the tubes and can thus result in an unwanted waste of the fluid.

Accordingly, what is needed in the art are improved fluid manifold systems that overcome one or more of the above shortcomings.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope. In the drawings, like numerals designate like elements. Furthermore, multiple instances of an element may each include separate letters appended to the element number. For example two instances of a particular element "20" may be labeled as "20*a*" and "20*b*". In that case, the element label may be used without an appended letter (e.g., "20") to generally refer to every instance of the element; while the element label will include an appended letter (e.g., "20*a*") to refer to a specific instance of the element.

DETAILED DESCRIPTION OF THE PREFERRED EMBODIMENTS

As used in the specification and appended claims, directional terms, such as "top," "bottom," "up," "down," "upper," "lower," "proximal," "distal," and the like are used herein solely to indicate relative directions and are not otherwise intended to limit the scope of the invention or claims.

The present disclosure relates to fluid manifold systems through which a sterile or non-sterile fluid, such as a liquid, powder, gas, or other materials, or combinations of materials, can flow. As used in the Detailed Description, Abstract, and appended claims herein, the term "fluid connection" or equivalent phrasing means a connection through which a fluid can pass but which is not limited to "liquids." For example, in different embodiments of the present invention the inventive connector systems can form "fluid connections" through which liquids, gases, powders, other forms of solids, and/or combinations thereof are intended to pass.

The fluid manifold systems can be used in a variety of different fields for a variety of different applications. By way of example and not by limitation, the fluid manifold systems can be used in the biotechnology, pharmaceutical, medical, and chemical industries in the manufacture, processing, treating, transporting, sampling, storage, and/or dispensing of sterile or non-sterile liquid products. Examples of sterile liquid products that can be used with the fluid manifold systems include media, buffers, reagents, cell and microorganism cultures, vaccines, chemicals, blood, blood products and other biological and non-biological fluids.

To avoid the requirement for cleaning or maintenance, the fluid manifold systems can be designed to be disposable. Alternatively, they can also be reusable. Although the fluid manifold systems of the present invention can be used to form a sterile connection for moving sterile materials, it is appreciated that the fluid manifold systems can also be used for making connections that are non-sterile or are sterile to a limited extent.

Figure 1:
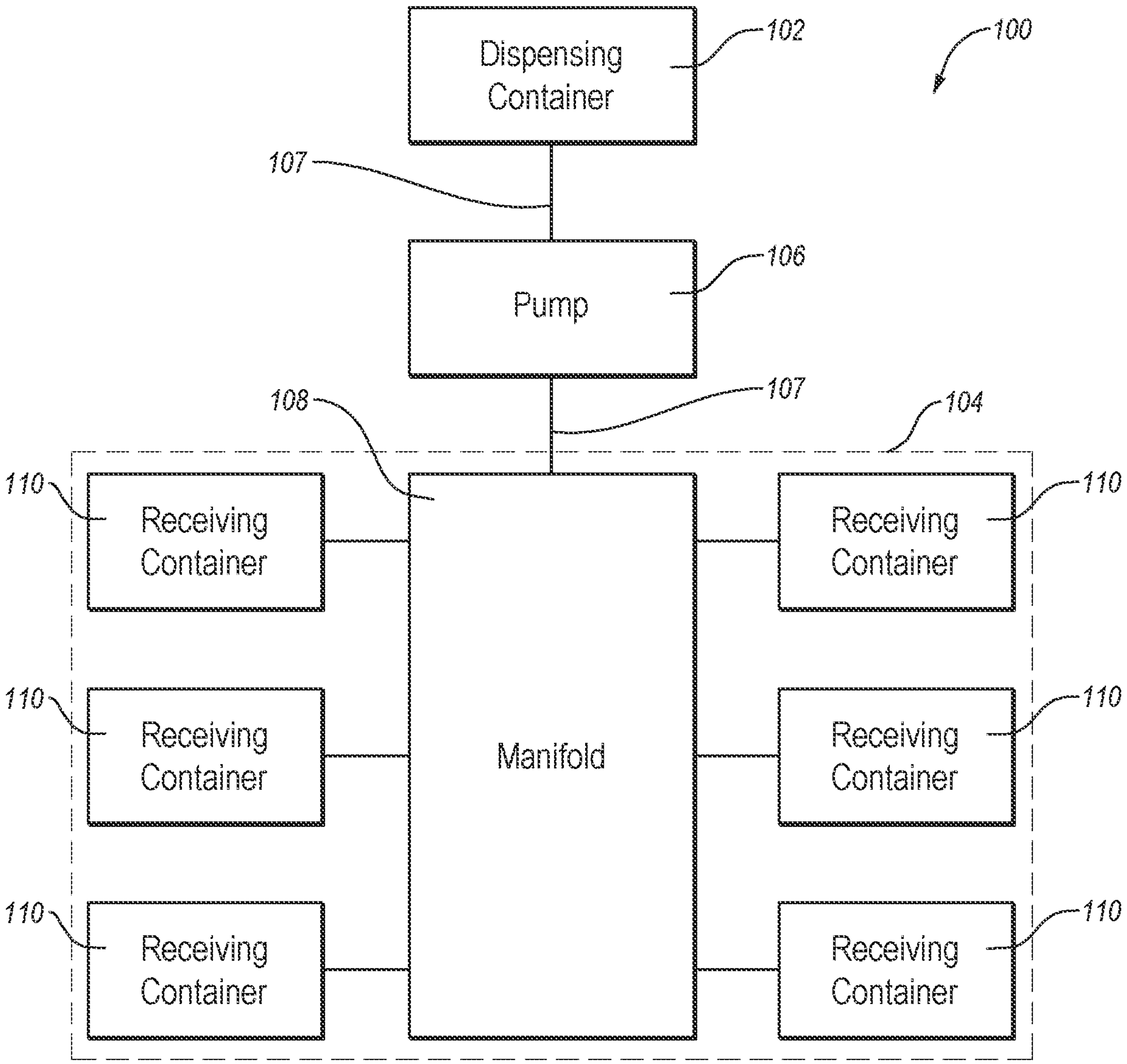
FIG. 1 is a block diagram of a manifold system according to one embodiment.

Depicted in FIG. 1 is an exemplary dispensing system 100 in which one embodiment of the inventive manifold system can be used. Dispensing system 100 includes a dispensing container 102, a manifold system 104 fluidly coupled thereto, and a pump 106 for moving fluid therebetween. Dispensing system 100 can be used for dispensing sterile or non-sterile biological or other type of fluids.

Dispensing container 102 can be any type of container or structure capable of storing a fluid. For example, dispensing container 102 can comprise a rigid vessel, such as a stainless steel container, in which the fluid is housed or can comprise a flexible bag in which the fluid is housed, the flexible bag typically being disposed within a support housing. Dispensing container 102 can also comprise different functional types of container systems such as mixing vessels, fermentors, or bioreactors used to grow cells or microorganisms. One example of a bioreactor that can be used is disclosed in U.S. Pat. No. 7,487,688, which issued on Feb. 10, 2009 and which is hereby incorporated by specific reference. Other types of dispensing containers 102 as are known by those skilled in the art can also be used.

Pump 106 is used for controlling fluid flow between dispensing container 102 and fluid manifold system 104. When pump 106 is activated, fluid is caused to flow in a controlled manner from dispensing container 102 and into fluid manifold system 104 through a conduit 107. Pump 106 can comprise any pump used in conventional dispensing systems as are known by those skilled in the art. For example, pump 106 typically comprises a peristaltic pump that operates in conjunction with conduit 107 for pumping the fluid therethrough. In this embodiment, conduit 107 typically comprises a flexible tube. In alternative embodiments, pump 106 can comprise a conventional fluid pump where the fluid passes directly through the pump.

In some embodiments, pump 106 can be omitted and fluid manifold system 104 can be fluidly connected directly to dispensing container 102. For example, pump 106 may be omitted in a dispensing system that uses gravity to cause the fluid to flow from dispensing container 102 through conduit 107 to fluid manifold system 104.

Conduit 107 between dispensing container 102 and fluid manifold system 104 can comprise flexible tubing, a hose, a rigid pipe, or any other type of conduit as is known in the art. If desired, one or more filters can be fluid coupled with conduit 107 for filtering and/or sterilizing the fluid as it passes therethrough.

Figure 2:
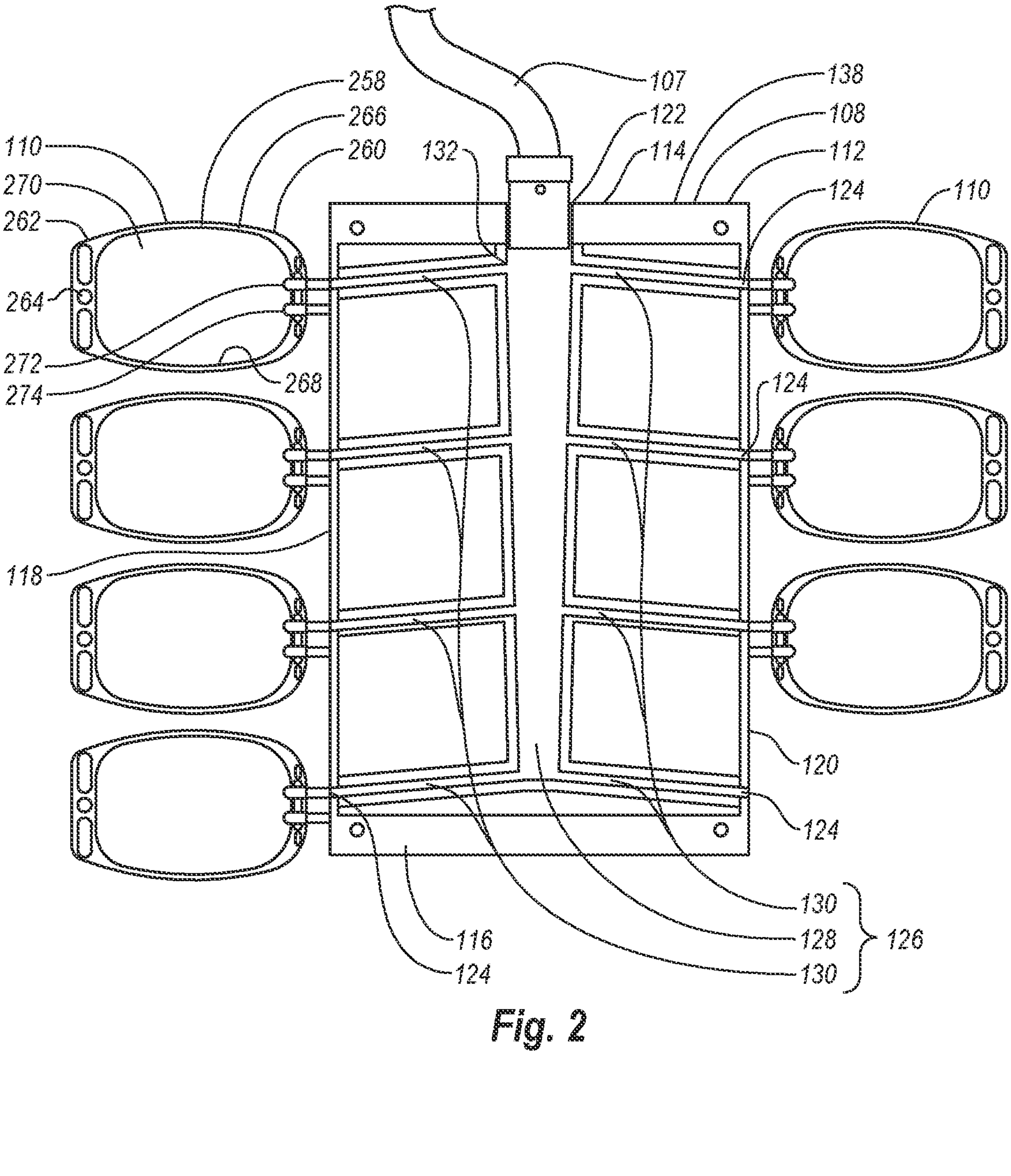
FIG. 2 is a top plan view of a manifold system according to one embodiment, in which the manifold is formed from opposing sheets.

Fluid manifold system 104 comprises a manifold 108 and one or more receiving containers 110 removably fluid coupled thereto. Turning to FIG. 2, each receiving container 110, also known in the art as a fill bag, comprises a main body 258 extending from a proximal end 260 to a spaced apart distal end 262. Main body 258 typically comprises a flexible bag made of one or more sheets of flexible, polymeric material, although other materials may also be used. More specifically, main body 258 typically comprises a two-dimensional pillow-type bag where two polymeric sheets are overlaid and then seamed around a perimeter to bound a fluid compartment. In other embodiments main body 258 can comprise a 3-dimensional bag. Main body 258 can be made of the same types of materials as manifold 108, discussed below. In one embodiment, main body 258 is made of the same materials as manifold 108.

One or more hanger holes 264 can extend through a seamed perimeter edge of main body 258 at distal end 262 or at other locations. Hanger holes 264 are used to hang receiving container 110 after receiving container 110 has been filled, as is known in the art.

Main body 258 includes an outer wall 266 having an inner surface 268 bounding a compartment 270. A fluid inlet 272 and a fluid outlet 274 extend through outer wall 266 to fluidly communicate with compartment 270. Through fluid inlet 272, fluid is passed into compartment 270 from manifold 108; through fluid outlet 274, fluid is passed out of compartment 270 after receiving container 110 has been filled. In the depicted embodiment, fluid inlet 272 and fluid outlet 274 are positioned on the opposite end (i.e., proximal end 260) of main body 258 as hanger holes 264, although this is not required. Furthermore, although fluid inlet 272 and fluid outlet 274 are depicted as being positioned on the same end as each other, this also is not required. For example, fluid outlet 274 can extend from distal end 262.

Figure 7:
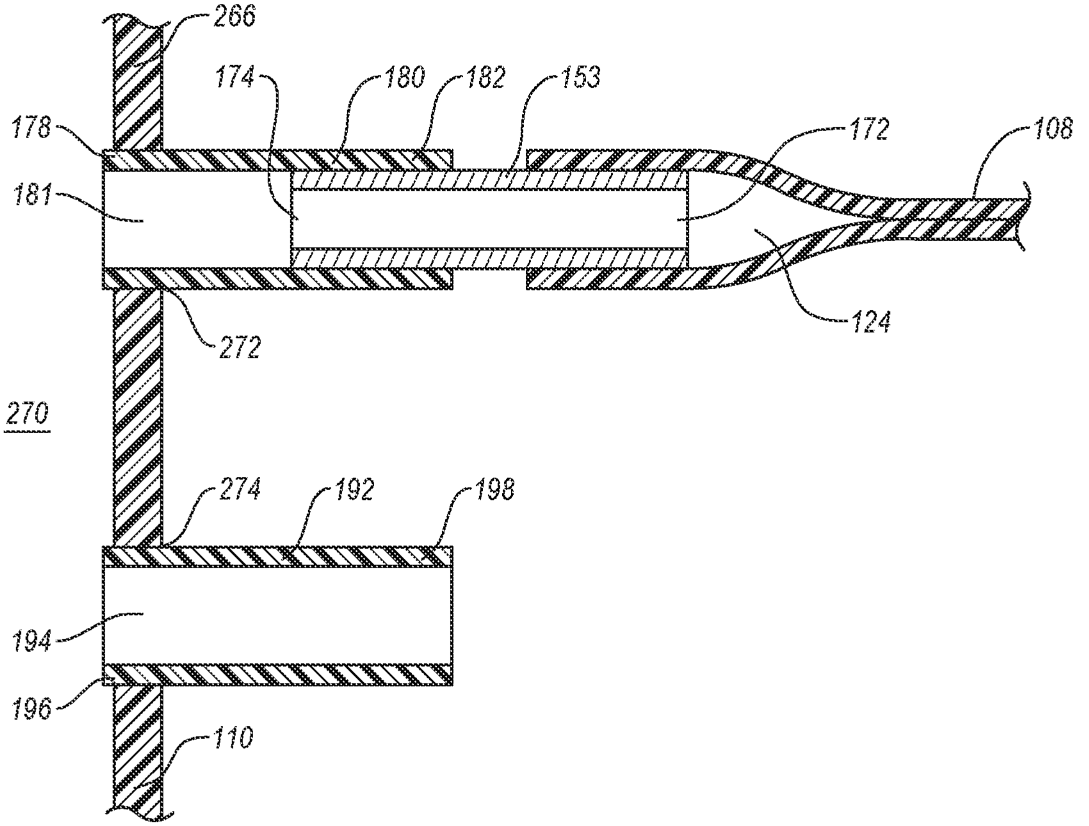
FIG. 7 is a cross sectional side view of another embodiment of a fluid coupling between the manifold and the receiving container.

Turning to FIG. 7, receiving container 110 further comprises one or more connectors positioned at fluid inlet 272 and/or fluid outlet 274 of main body 258. Each connector can comprise a port, a tube, or other connector that can provide fluid connection through fluid inlet 272 or fluid outlet 274 to compartment 270. For example, in the embodiment shown in FIG. 7, the connector can comprise a tube 180 having a lumen 181 extending completely therethrough from a first end 178 to a spaced apart second end 182. First end 178 is coupled to receiving container 110 at fluid inlet 272. Second end 182 is configured to fluidly connect to manifold 108, as discussed below. Tube 180 can be welded, glued, press fit, fastened, or otherwise secured to receiving container 110.

Similarly, a tube 192 having a lumen 194 extending completely therethrough from a first end 196 to a spaced apart second end 198 can be coupled to receiving container 110 at fluid outlet 274. Tube 192 can be secured to receiving container 110 in a similar manner as tube 180. Because tube 192 is used to dispense fluid from compartment 270 after compartment 270 has been filled, second end 198 of tube 192 can be clamped or sealed closed before compartment 110 is filled with fluid, and then be opened or unsealed when it is desired to dispense the fluid. To seal tube 192, second end 198 thereof can be welded or otherwise seamed closed, as is known in the art. When it is desired to allow fluid to flow out of compartment 270 through tube 192, sealed second end 198 can be cut off, thereby opening lumen 194 to allow the fluid passage therethrough. Alternatively, a connector can be attached to second end 198 to seal tube 192. For example, an aseptic connector, similar to those discussed below, can be attached to second end 198.

Tubes 180 and 192 can be of any length desired, based on the filling requirements and end use of receiving container 110 and are typically flexible. Furthermore, tube 180 can be the same or different length as tube 192.

As shown in FIG. 2, manifold 108 has a perimeter edge 112 comprising a proximal edge 114, a spaced apart distal edge 116, and first and second lateral edges 118, 120. A fluid inlet 122 is disposed on proximal edge 114 to receive fluid from dispensing container 102 and/or pump 106 through conduit 107. A plurality of fluid outlets 124 are disposed on one or both lateral edges 118, 120. It is appreciated that fluid inlet 122 and fluid outlets 124 can be disposed on any portion of perimeter edge 112 as desired. The number of fluid outlets 124 can vary. For example in some embodiments two to eight fluid outlets are common. In some embodiments, at least two, at least four, at least six, or at least eight fluid outlets 124 are used. Other numbers of fluid outlets can also be used.

A fluid flow path 126 is formed in manifold 108 to fluidly couple fluid inlet 122 to each fluid outlet 124. Fluid flow path 126 includes a primary flow path 128 that communicates with fluid inlet 122 and extends from proximal edge 114 toward distal edge 116. A plurality of spaced apart secondary flow paths 130 are also included that branch off of primary flow path 128 at separate fluid junctures 132. Each secondary flow path 130 communicates with a corresponding one of the plurality of spaced apart fluid outlets 124. As such, the number of secondary flow paths 130 typically equals the number of fluid outlets 124, although that is not required.

Fluid flow path 126 can be designed so that all receiving containers 110 are filled at substantially equal rates, if desired. For example, primary flow path 128 can be tapered along its length, as shown in the depicted embodiment. Tapering of primary flow path 128 can help maintain a substantially constant fluid pressure into each secondary flow path 130. In addition, each secondary flow path 130 can be pinched or closed off at one or more locations to control the flow of fluid into corresponding receiving container 110 thereby allowing equal amounts of fluid to flow through each secondary flow path 130. Alternatively, each secondary flow path 130 can be pinched or closed off only after a corresponding receiving container 110 has been filled to the desired amount. In this manner, fluid may flow into each receiving container 110 at a different rate and the corresponding secondary flow path 130 can be closed off sooner or later than the others. Furthermore, primary flow path 128 and secondary flow paths 130 can be selectively pinched or closed off so that receiving container 110 can be sequentially filled either one at a time or in predetermined combinations, as discussed in more detail below.

Primary flow path 128 can have a maximum cross sectional diameter or unexpanded width that ranges between about 0.2 cm to about 10 cm with about 0.2 cm to about 5 cm being common. Other maximum cross sectional diameter or unexpanded width ranges are also possible. Secondary flow paths 130 can have the same or smaller maximum cross sectional diameters or unexpanded width as primary flow path 128 and can extend orthogonally from primary flow path 128 or extend at an angle therefrom, as in the depicted embodiment.

Figure 10A:
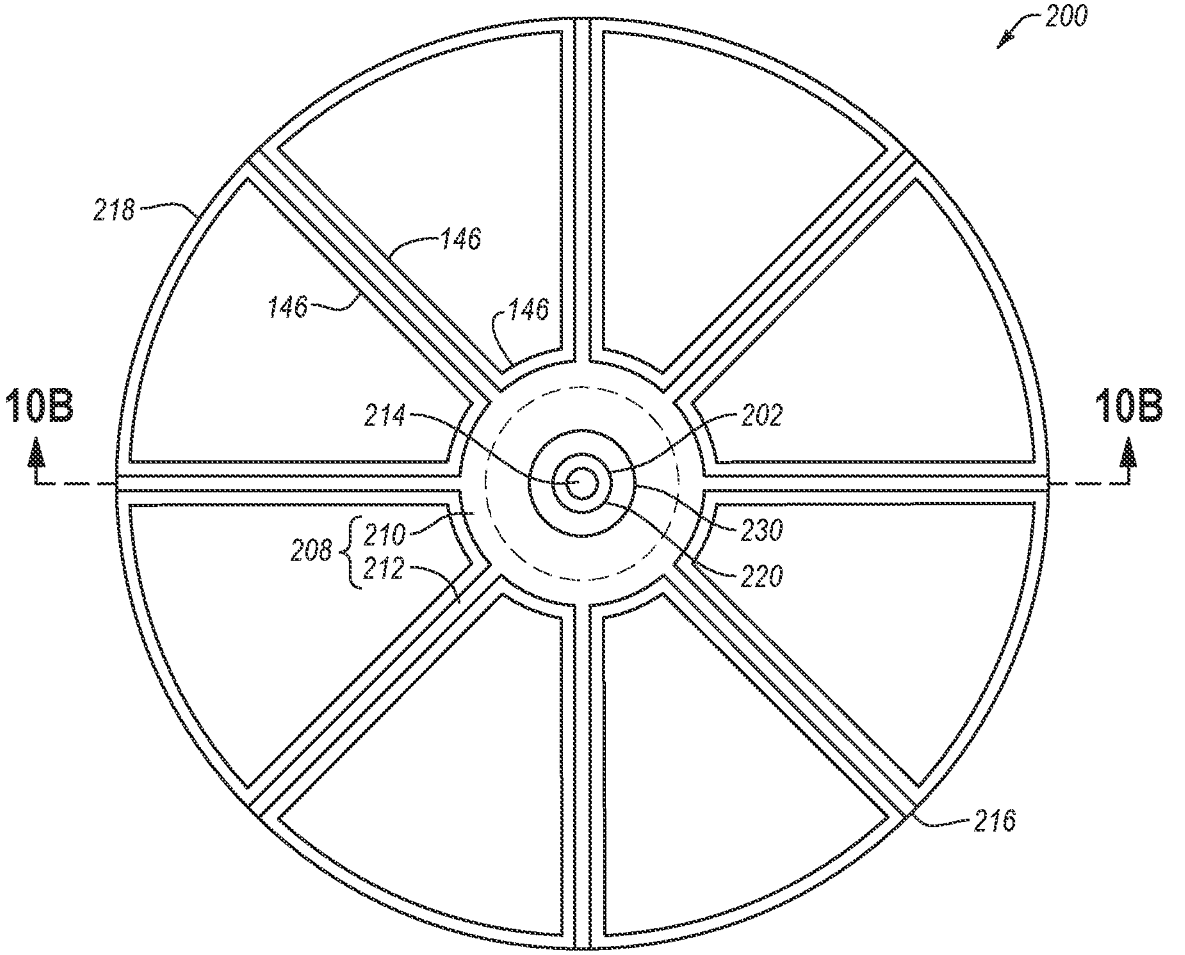
FIG. 10A is a top plan view of a manifold according to another embodiment.

In the depicted embodiment, manifold 108 is substantially rectangular. Other shapes can also be used. For example, manifold 108 can also be oval, circular, polygonal or have other regular or irregular shapes. For example, FIG. 10A shows an embodiment in which the manifold is substantially circular.

Figure 3:
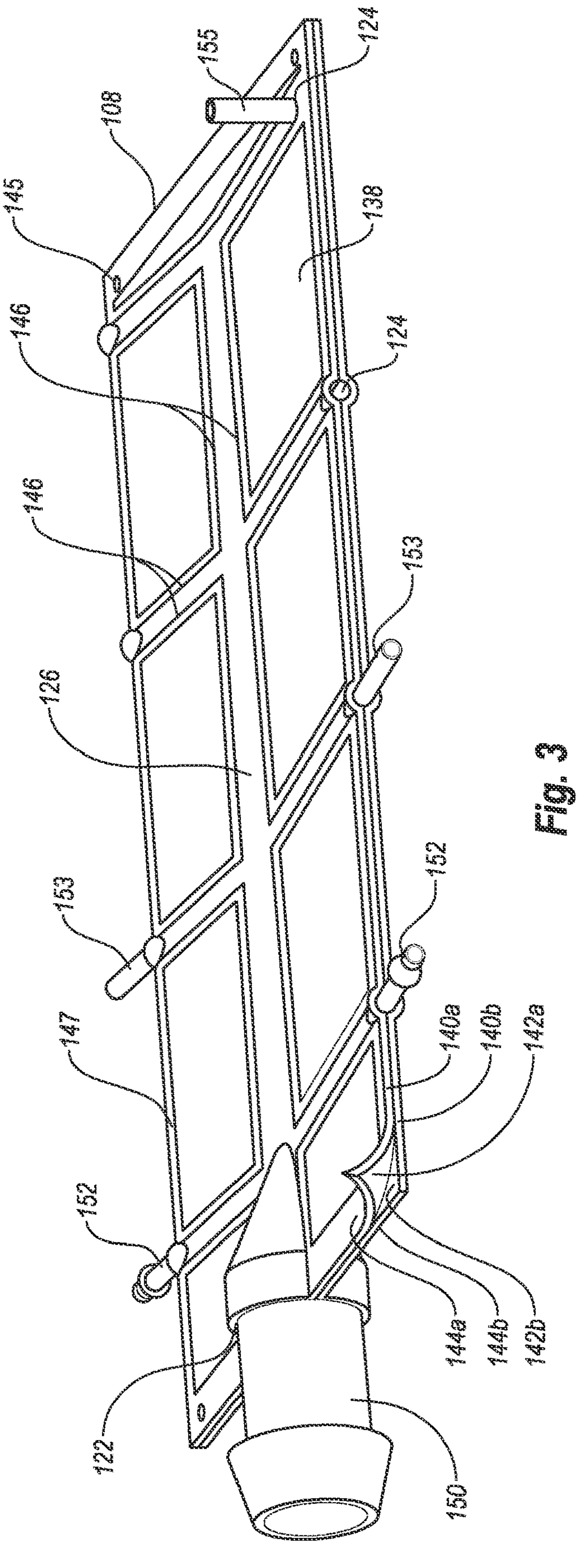
FIG. 3 is a perspective view of a manifold according to one embodiment.

In one embodiment, manifold 108 includes a main body 138 comprising opposing flexible sheets coupled together to form the fluid flow path 126 therebetween. For example, as shown in FIG. 3, main body 138 is comprised of a first flexible sheet 140*a* and a second flexible sheet 140*b*, each respectively having an inside face 142*a*, 142*b* and an opposing outside face 144*a*, 144*b*. First flexible sheet 140*a* is positioned on second flexible sheet 140*b* such that the inside faces 142*a* and 142*b* of both flexible sheets lie directly against each other. As will be discussed below in greater detail, inside faces 142*a* and 142*b* are selectively secured together along seam lines to form fluid flow path 126 therebetween. One or more aligning holes 145 can be positioned on each sheet to aid in alignment thereof during manufacturing of the manifold, as discussed below.

Each sheet 140 can be comprised of a flexible, fluid and/or gas impermeable material such as a low-density polyethylene or other polymeric sheets having a thickness in a range between about 0.1 mm to about 5 mm with about 0.2 mm to about 2 mm being common. Other thicknesses can also be used. Each sheet 140 can be comprised of a single ply material or can comprise two or more layers which are either sealed together or separated to form a double wall structure. Where the layers are sealed together, the material can comprise a laminated or extruded material. The laminated material can comprise two or more separately formed layers that are subsequently secured together by an adhesive.

The extruded material can comprise a single integral sheet that comprises two or more layers of different materials that can be separated by a contact layer. All of the layers can be simultaneously co-extruded. One example of an extruded material that can be used in the present invention is the HyQ CX3-9 film available from HyClone Laboratories, Inc. out of Logan, Utah. The HyQ CX3-9 film is a three-layer, 9 mil cast film produced in a cGMP facility. The outer layer is a polyester elastomer coextruded with an ultra-low density polyethylene product contact layer. Another example of an extruded material that can be used in the present invention is the HyQ CX5-14 cast film also available from HyClone Laboratories, Inc. The HyQ CX5-14 cast film comprises a polyester elastomer outer layer, an ultra-low density polyethylene contact layer, and an EVOH barrier layer disposed therebetween. In still another example, a multi-web film produced from three independent webs of blown film can be used. The two inner webs are each a 4 mil monolayer polyethylene film (which is referred to by HyClone as the HyQ BM1 film) while the outer barrier web is a 5.5 mil thick 6-layer coextrusion film (which is referred to by HyClone as the HyQ BX6 film).

The material is approved for direct contact with living cells and is capable of maintaining a solution sterile. In such an embodiment, the material can also be sterilizable such as by ionizing radiation. Examples of materials that can be used in different situations are disclosed in U.S. Pat. No. 6,083,587 which issued on Jul. 4, 2000 and U.S. Patent Publication No. US 2003-0077466 A1, published Apr. 24, 2003 which are hereby incorporated by specific reference.

It is appreciated that first and second flexible sheets 140*a* and 140*b* can alternatively be formed from a single sheet that has been folded over to form two separate portions. In those embodiments, first and second flexible sheets 140*a* and 140*b* respectively correspond to each of the two separate folded portions. It is also appreciated that more than two sheets 140 can be used to form manifold 108 (see, e.g., FIG. 11).

In one embodiment, fluid flow path 126 is formed by selectively welding flexible sheets 140*a* and 140*b* together. For example, in the embodiment depicted in FIG. 3, first and second flexible sheets 140*a* and 140*b* have been welded along seam lines 146 that outline the perimeter of and form fluid flow path 126 therebetween. Welding of flexible sheets 140*a* and 140*b* to form seam lines 146 can be performed by using conventional welding techniques such as heat welding, RF energy, ultrasonic, and the like. Other conventional techniques can also be used to form seam lines 146 such as adhesives, crimping or other conventional attaching or fastening techniques or other methods known in the art.

If desired, seam lines 147 can also be formed around the perimeter edge of sheets 140*a* and 140*b* and particularly through the areas of aligning holes 145. It is also appreciated that all of the areas of sheets 140*a* and 140*b* could be seamed together except for the area of flow path 126. However, this extent of seaming may be inefficient and unnecessary. By forming main body 138 by using the above process, manifold 108 can be easily and inexpensively manufactured having any desired configuration for flow path 126.

Each of flexible sheets 140 is configured to flex outward to allow fluid to more easily flow through fluid flow path 126. For example, FIGS. 4A and 4B respectively depict a portion of fluid flow path 126 when flow path 126 is empty and when fluid is flowing through flow path 126. In the non-flowing position shown in FIG. 4A, the inside surfaces 142*a*, 142*b* of flexible sheets 140*a*, 140*b* lie against each other such that very little space is disposed within fluid flow path 126. As such, there is minimal gas or fluid within flow path 126. In the flowing position shown in FIG. 4B, however, both sheets 140*a*, 140*b* have flexed outward so that inside surfaces 142*a*, 142*b* no longer lie against each other, thereby opening up fluid flow path 126 to allow fluid to freely flow therethrough.

Figure 4A:
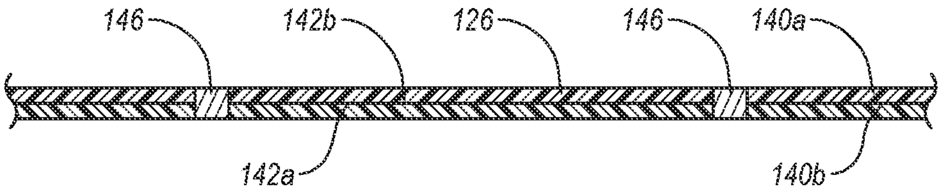
FIGS. 4A and 4B are cross sectional side views of a portion of the manifold shown in FIG. 2, showing a portion of the fluid flow path in an empty (FIG. 4A) and a filled (FIG. 4B) state.
Figure 4B:
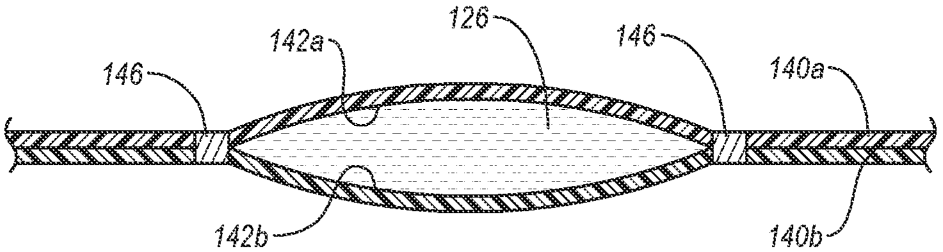

Prior to use, fluid flow path 126 is initially in the non-flowing position of FIG. 4A and thus there is minimal gas within flow path 126. When fluid flows between dispensing container 102 and receiving containers 110, fluid flow path 126 moves to the flowing position shown in FIG. 4B. The flowing fluid pushes the gas within flow path 126 into receiving containers 110. However, because there is minimal gas within flow path 126, there is minimal gas pushed into receiving containers 110. It is desirable to minimize the gas within receiving container 110 since the gas can occupy desired space for the liquid and can have negative effects on the liquid. Once receiving containers 110 have been filled to the desired amount, the flow of fluid to receiving containers 110 is terminated by stopping flow from dispensing container 102 or crimping, pinching or sealing the flow through flow path 126 or by otherwise sealing the flow to receiving containers 110 as discussed below.

If desired, once the flow of fluid has been stopped, fluid that remains within fluid flow path 126 of manifold 108 can be easily squeezed or scraped into a receiving container 110 or into some other container. For example, a process can be used to progressively collapse the fluid flow path along at least a portion of the length of the manifold so as to force a portion of the fluid within the fluid flow path into one of the receiving containers. This can be accomplished by using a squeegee, scraper, roller, or other tool to press down on flexible sheet 140*a* and pass along all or portions of flow path 126 to force the fluid down the flow path and into a container. This minimizes waste of the fluid. In some embodiments, flexible sheets 140 are resilient so that once the flow of fluid through fluid flow path 126 has ended, fluid flow path 126 returns to the non-flowing state of FIG. 4A, thereby causing any remaining fluid within fluid flow path 126 to flow into a container.

In contrast, because conventional manifolds are typically made of tubing, it can be significantly more difficult to squeeze or scrape the fluid out of conventional manifolds, especially at the joints that are commonly rigid. Likewise, because tubing is fully expanded prior to use, the tubing contains a significant amount of undesirable gas that is pushed by the fluid into the receiving containers during the filling stage.

Thus, the present invention is advantageous over conventional manifolds as less fluid is wasted and less gas is pushed into the receiving containers. In many instances, the fluid that is moved through the manifolds is expensive, e.g., thousands of dollars an ounce or more. In these cases, employing embodiments of the present invention can amount to a substantial monetary savings.

Sheets 140 can be designed to prevent liquid and gas transfer therethrough and to keep flow path 126 and the fluid that flows therethrough sterile. To that end, flexible sheets 140 can be made of a single layer or a plurality of layers each composed of the same or different material to provide similar or different properties, as desired. By choosing multiple layers each with different properties, manifolds 108 can be formed that meet the individual needs of the specific use for which the manifolds are created.

Figure 5:
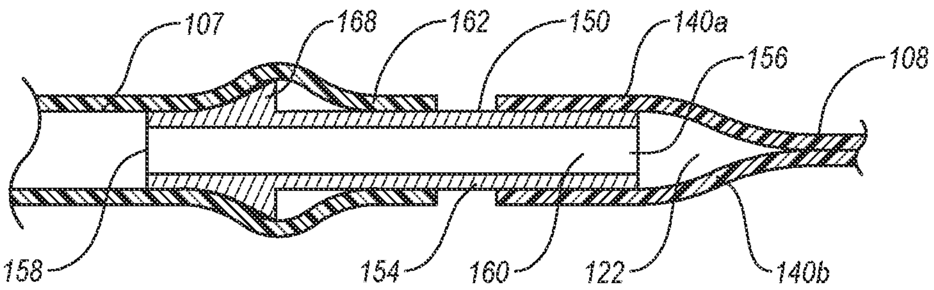
FIG. 5 is a close up view showing the attachment of the inlet coupler to the fluid inlet.
Figure 6:
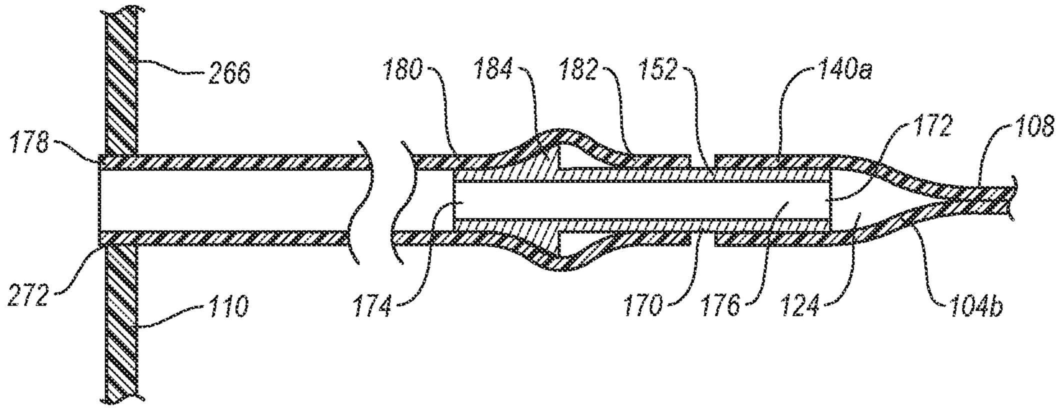
FIG. 6 is a cross sectional side view of one embodiment of a fluid coupling between the manifold and the receiving container.

Returning to FIG. 3, manifold 108 further comprises one or more connectors positioned within fluid inlet 122 and/or fluid outlets 124 of main body 138. Each connector can comprise a coupling device and/or a port or other connector that can establish a fluid connection. For example, in the depicted embodiment an inlet coupler 150 is secured within fluid inlet 122 and a number of outlet couplers 152 and 153 are secured within various fluid outlets 124. A port 155 is secured within another of the fluid outlets 124. FIG. 5 is a close up view of inlet coupler 150 secured within fluid inlet 122. FIGS. 6 and 7 include close up views of outlet couplers 152 and 153, respectively, secured within fluid outlets 124.

As shown in FIG. 5, inlet coupler 150 comprises a tubular body 154 extending from a first end 156 to a spaced apart second end 158. Body 154 bounds a passageway 160 extending therethrough. First end 156 is secured between sheets 140*a* and 140*b* at fluid inlet 122 by welding, glue, press-fit, fastener, or any other securing method known in the art. Second end 158 of inlet coupler 150 is configured to receive an end 162 of conduit 107 whose other end is fluidly coupled with dispensing container 102 or pump 106, as discussed above. Conduit 107 can be welded, glued, fastened, press fit or otherwise secured to inlet coupler 150.

Although not required, one or more barbs 168 or other securing member can also be included on inlet coupler 150 to aid in securing conduit 107 to inlet coupler 150. In this embodiment, conduit 107 can be slid over barb 168 and then a tie can be cinched around end 162 so as to form a sealed connection. Inlet coupler 150 can be made of a polymeric material, metal, ceramic, or any other material or combination thereof and is typically more rigid than conduit 107 in which it is received. It is appreciated that other conventional fluid connectors such as a luer lock or aseptic connector can be used to fluid couple inlet coupler 150 and conduit 107. (See, e.g., aseptic connector 256 in FIG. 12.) In yet other embodiments, end 162 of conduit 107 can be sealed directly between sheets 140*a* and 140*b* at fluid inlet 122.

As shown in FIG. 6, each outlet coupler 152 can also comprise a tubular body 170 extending from a first end 172 to a spaced apart second end 174. Body 170 bounds a passageway 176 extending therethrough. First end 172 is secured between sheets 140*a* and 140*b* at fluid outlet 124 by welding, glue, press-fit, fastener or any other securing method known in the art. Second end 174 of outlet coupler 152 is configured to receive an end of the connector extending from fluid inlet 272 of one of receiving containers 110. For example, in the depicted embodiment, second end 174 of outlet coupler 152 is connected to second end 182 of outlet tube 180 whose first end 178 is fluidly coupled with one of receiving containers 110 at fluid inlet 272, as discussed above. Outlet tube 180 can be welded, glued, press fit, or otherwise secured within or onto outlet coupler 152. Other securing methods can also be used. Similar to inlet coupler 150, one or more barbs 184 or other securing member can also be included on each outlet coupler 152 to aid in securing outlet tube 180 to outlet coupler 152. Outlet couplers 152 can be made of the same type of materials as inlet coupler 150 discussed above.

Turning to FIG. 7, an alternative outlet coupler 153 is used to produce fluid communication between receiving container 110 and manifold 108. Outlet coupler 153 is similar to outlet coupler 152 except that outlet coupler 153 does not include a barb extending radially away therefrom. To attach receiving container 110 to manifold 108, first end 172 of outlet coupler 153 is positioned within fluid outlet 124 of manifold 108 and second end 174 of outlet coupler 153 is positioned within outlet tube 180 of receiving container 110. Manifold 108 and tube 180 can then be welded, glued, fastened, or otherwise secured to outlet coupler 153.

Inlet coupler 150 and outlet couplers 152 and 153 can be used to create sterile or non-sterile connections. For sterile fluid connections, manifold system 104, including manifold 108 and receiving containers 110, can be sterilized as a unit once manifold system 104 and receiving containers 110 have been fluidly secured to each other. Alternatively, manifold 108 and receiving containers 110 can be separately sterilized. Receiving containers 110 can then be selectively coupled to manifold 108 as needed.

Figure 8:
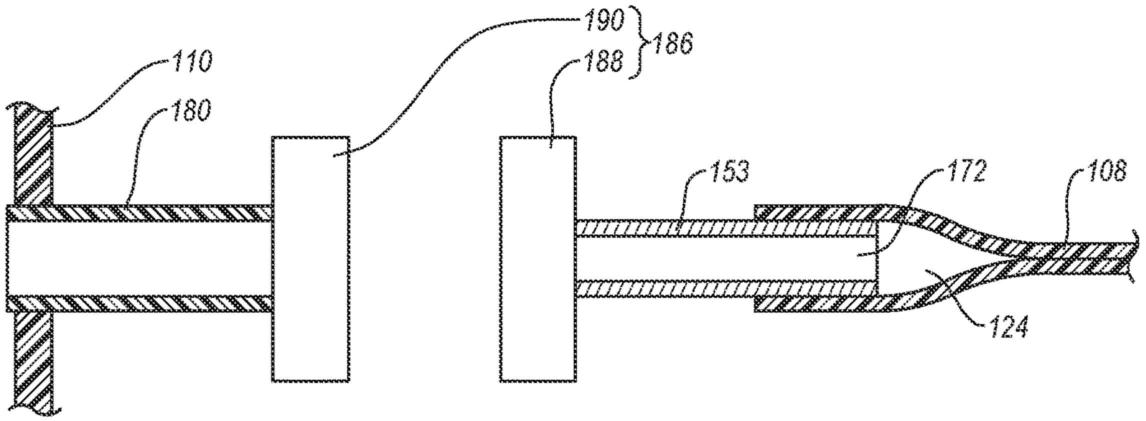
FIG. 8 is a cross sectional side view of one embodiment of a fluid coupling between the manifold and the receiving container that incorporates an aseptic connector.

For example, as shown in FIG. 8, aseptic connectors 186 can be used to attach manifold 108 to receiving containers 110 and/or dispensing container 102. Aseptic connector 186 typically comprises two mating portions 188 and 190, each sealed so that the internal sections can remain sterile once sterilized. Mating portions 188 and 190 are respectively secured to outlet coupler 153 and tube 180. To fluidly attach receiving container 110 to manifold 108, mating portions 188 and 190 are secured together, after which the seals are removed from the mating portions to allow fluid communication between the two halves. Because the seals are not removed until mating portions 188 and 190 have been secured to one another, the internal sections thereof remain sterilized.

By way of example only, a PALL KLEENPACK® connector can be used as aseptic connector 186 in place of inlet coupler 150 or outlet couplers 152 and 153 or in combination thereof to provide a sterile connection between manifold 108 and receiving containers 110 and dispensing container 102. This will allow receiving containers 110 to be detached from manifold 108 yet retain the sterility of the fluid therein. The PALL connector is described in detail in U.S. Pat. No. 6,655,655, the content of which is incorporated herein by reference in its entirety.

Figure 9:
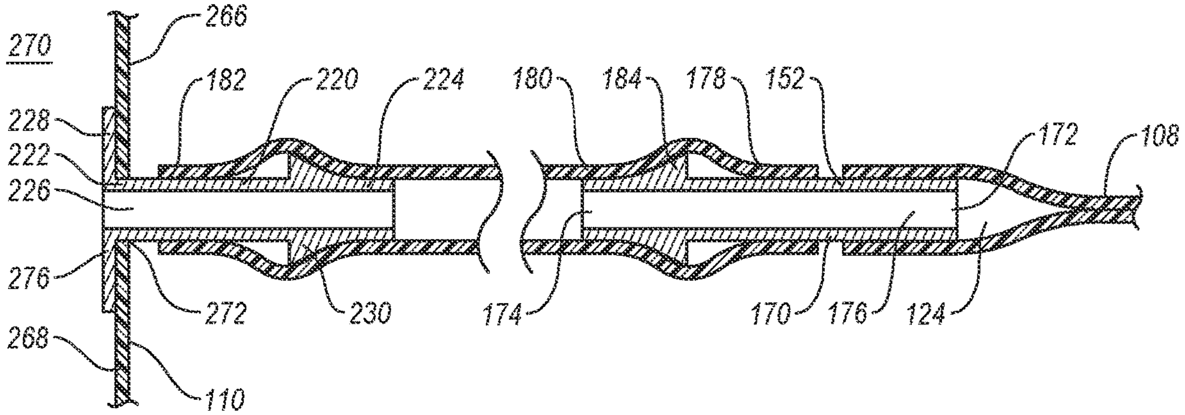
FIG. 9 is a cross sectional side view of another embodiment of a fluid coupling between the manifold and the receiving container.

A port can also be positioned within any fluid inlet or outlet, alone or in conjunction with a coupler. For example, FIGS. 3, 9, and 10 show ports 155, 276, and 202, respectively, positioned at a manifold outlet 124 positioned in upper sheet 140*a*, container inlet 272, and a manifold inlet 214 positioned on an upper sheet 204*a*. Ports 155, 276, and 202 provide alternative embodiments to connecting to receiving container 110 and manifold 108.

Turning to FIG. 9, port 276 is positioned at fluid inlet 272 of receiving container 110 and outlet tube 180 is attached to port 276. Port 276 comprises a tubular body 220 extending from a first end 222 to a spaced apart second end 224. Body 220 bounds a passageway 226 extending therethrough. A flange 228 extends radially outward from tubular body 220 at first end 222. Port 276 is positioned within fluid inlet 272 so that second end 224 of tubular body 220 extends outward from receiving container 110 and flange 228 is secured to inner surface 268 of outer wall 266 in which fluid inlet 272 is formed. Flange 228 can be secured to inner surface 268 by welding using conventional welding techniques such as heat welding, RF energy, ultrasonic, and the like or by using adhesives or any other conventional attaching or fastening techniques known in the art. One or more barbs 230 or other securing member can be included on or near second end 224 of inlet port 276 to aid in securing tube 180 or a coupler to port 276. Port 276 can be made of a polymeric material, metal, ceramic, or any other material or combination thereof.

Ports 155 have a similar structure as port 276 and can be made of the same type of materials. Port 155 can be used in place of couplers 152 and 153, as shown in FIG. 3. Port 202 can be used in place of inlet coupler 150, as shown in FIGS. 10A and 10B.

Figure 10B:
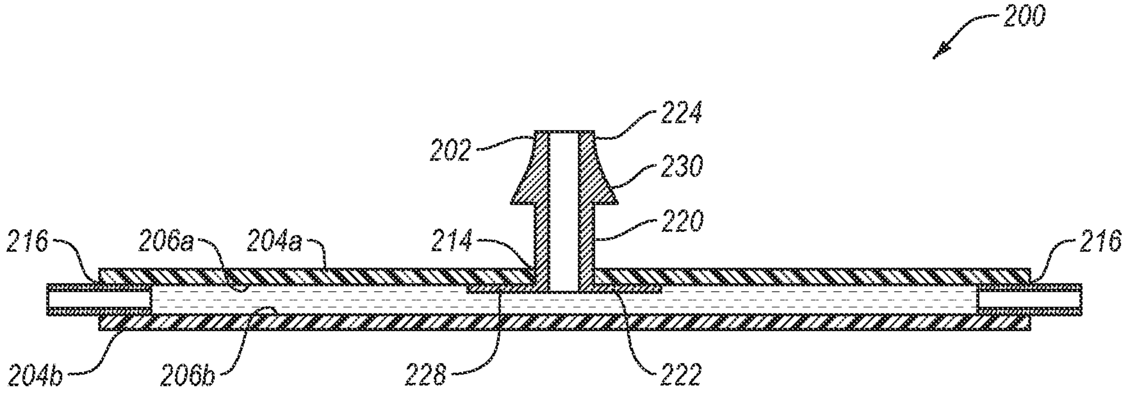
FIG. 10B is a cross sectional side view of the manifold shown in FIG. 10A, taken along the line 10B-10B.

FIGS. 10A and 10B show an alternative embodiment of a manifold 200. Similar to manifold 108, manifold 200 has a pair of flexible sheets 204*a* and 204*b* with inside surfaces 206*a* and 206*b* facing each other. Also similar to manifold 108, manifold 200 has formed therebetween a fluid flow path 208 comprising a primary flow path 210 and a plurality of secondary flow paths 212 extending between fluid inlet 214 and a plurality of fluid outlets 216. Flow paths 210 and 212 are formed by seam lines 146, as discussed above, that are formed by welding or otherwise securing together flexible sheets 204*a* and 204*b*. Manifold 200 also has a perimeter edge 218, but instead of having a rectangular shape, manifold 200 is substantially circular. Furthermore, fluid inlet 214 is centrally positioned on manifold 200 instead of being located on perimeter edge 218 and is only formed on one of the sheets 204. Fluid outlets 216 are positioned around perimeter edge 218 so that secondary flow paths 212 form a substantially spoke-like pattern with fluid inlet 214 being positioned at the hub of the spoke.

As noted above, inlet port 202 is positioned within fluid inlet 214 so that second end 224 of tubular body 220 extends outward from manifold 200 and flange 228 is secured to inside surface 206 of the sheet 204 in which fluid inlet 214 is formed. Flange 228 can be secured to inside surface 206 of sheet 204 in a similar manner to that discussed above with regards to the securing of flange 228 of port 276 to receiving container 110. One or more barbs 230 or other securing member can also be included on or near second end 224 of inlet port 202 to aid in securing an inlet tube or a coupler to inlet port 202.

Figure 11:
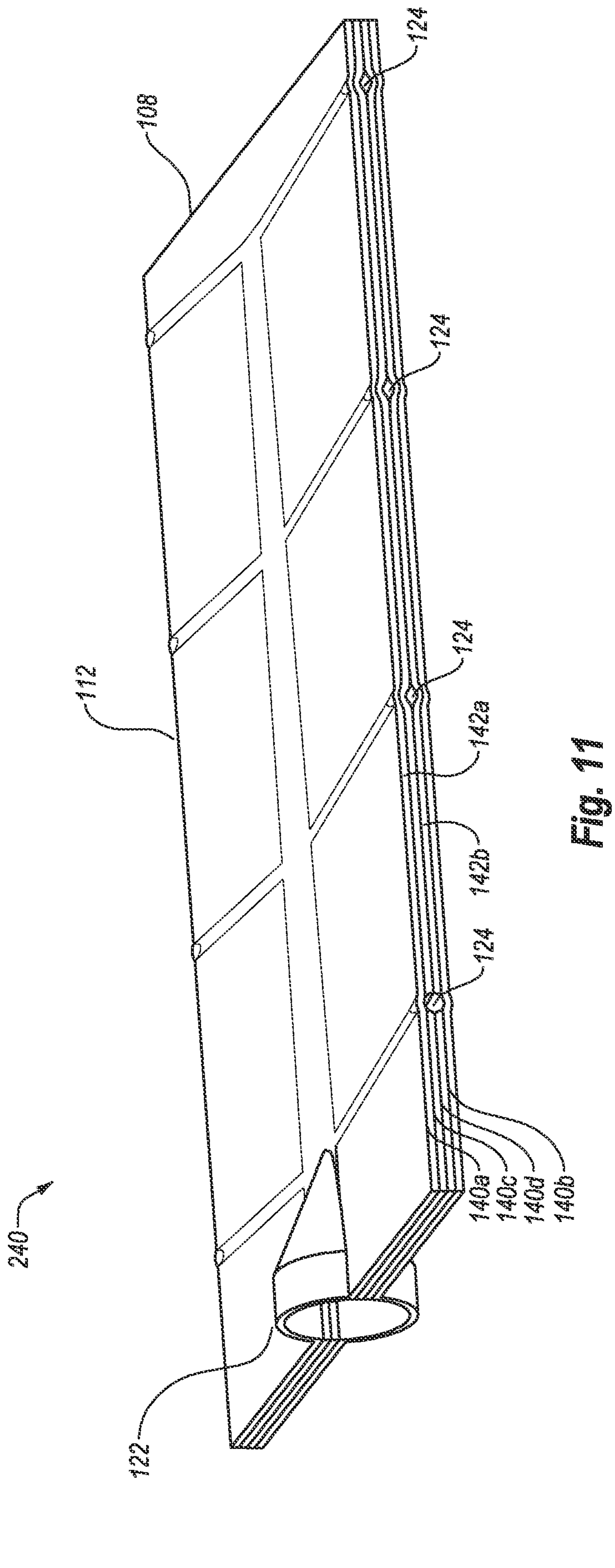
FIG. 11 is a perspective view of a manifold according to another embodiment.

As noted above, a manifold according to embodiments of the present invention can be comprised of more than two sheets. For example, FIG. 11 depicts a manifold 240 that includes third and fourth sheets 140*c* and 140*d* positioned between first and second sheets 140*a* and 140*b* and sealingly secured thereto along perimeter edge 112. Portions of either of the extra sheets 140*c* or 140*d* can be omitted between first and second sheets 140*a* and 140*b* to allow a space to be formed between inside surfaces 142*a* and 142*b* (FIG. 3) of sheets 140*a* and 140*b*, if desired. For example, extra sheets 140*c* and 140*d* can be shaped so that they are positioned between sheets 140*a* and 140*b* only around the perimeter edge and/or about or adjacent to the flow paths. Accordingly, as shown in FIG. 7, fluid outlets 124 and the related fluid flow path can be completely or partially bounded by all four sheets. Third and fourth sheets 140*c* and 140*d* can be rectangular or take any other shape, as desired. Furthermore, although two extra sheets are shown in the depicted embodiment, it is appreciated that only one extra sheet or three or more extra sheets can also be used. As previously discussed, the different sheets can have the same or different properties depending on desired objectives. For example, sheets 140*c* and 140*d* can be gas barrier layers.

Figure 12:
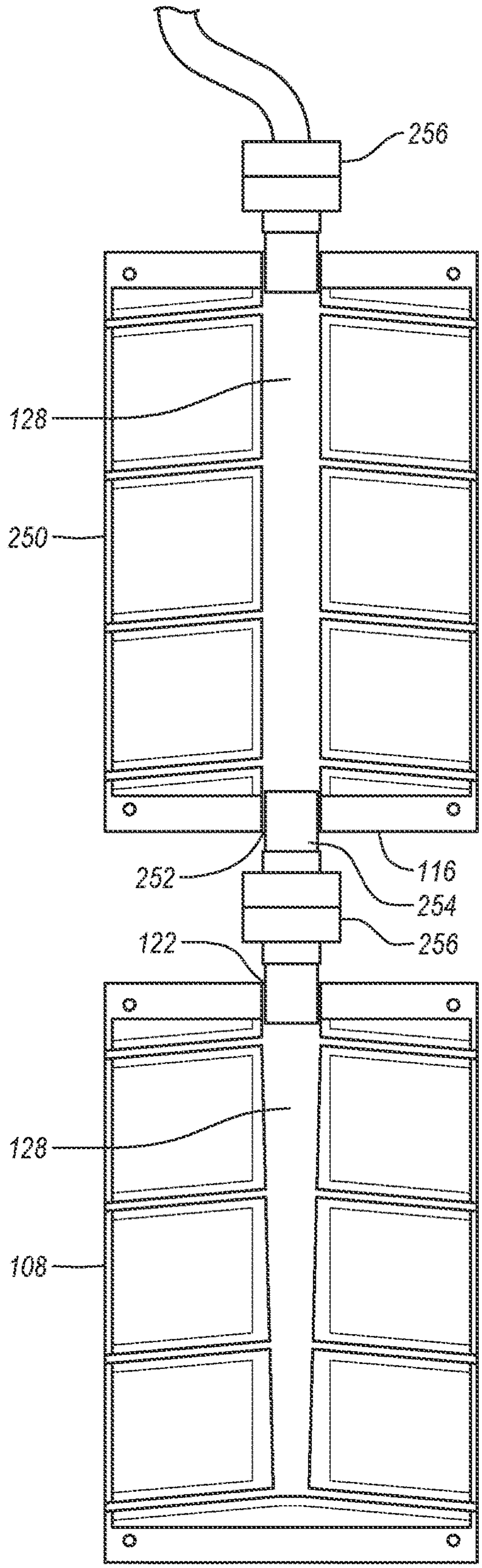
FIG. 12 is a top plan view of a manifold system in which a pair of manifolds are fluidly cascaded in series.

FIG. 12 shows an alternative embodiment of a manifold 250 that can be used if it is desired to use a plurality of manifolds in series. Manifold 250 is similar to manifold 108 except for a few things. Unlike manifold 108 in which primary flow path 128 tapers, primary flow path 128 in manifold 250 maintains a substantially constant cross sectional area along its entire length, although this is not required. In addition, in manifold 250, primary flow path 128 extends to an extender outlet 252 on distal edge 116. As a result, a connector can be secured within extender outlet 252 to fluidly connect manifolds together. The connector can comprise a coupler or a port, such as coupler 254, similar to any of the couplers and ports described above.

The coupler or port can be fluidly connected by a tube to fluid inlet 122 on another manifold. Alternatively, as shown in FIG. 12, opposing portions of an aseptic connector 256 similar to those discussed above can be used to connect manifolds 250 and 108 together. Portions of aseptic connector 256 can be connected to the couplers or ports extending through inlet 122 and extender outlet 252 so that a sealed connection will be maintained when the portions are connected. By using aseptic connectors 256, each manifold 250 can be separately sterilized and used as needed. As a result, adding additional manifolds 250 in series can be a simple manner of simply daisy-chaining the manifolds 250 together by connecting the aseptic connectors 256 between them. The system can remain sterile due to the use of the aseptic connectors 256.

By using the manifolds in series, the number of receiving containers can be increased. For example, by coupling two manifolds together, the number of receiving containers 110 can be doubled. Although only two manifolds 108 and 250 are shown connected together, it is appreciated that three or more manifolds can be connected together by simply connecting manifolds having extender outlets 252 together in whatever quantity is desired. As noted above, the sterility of each manifold can be maintained by using aseptic connectors to fluidly couple the manifolds. Manifolds may also be connected in parallel such that two or more manifolds are attached directly to the output of a single manifold. Other combinations can also be used. The number of manifolds that can be coupled in series is, in theory, unlimited. However, practical considerations such as fluid pressure loss, number of receiving containers, amount of fluid, etc. will likely define a practical desired limit.

Figure 13:
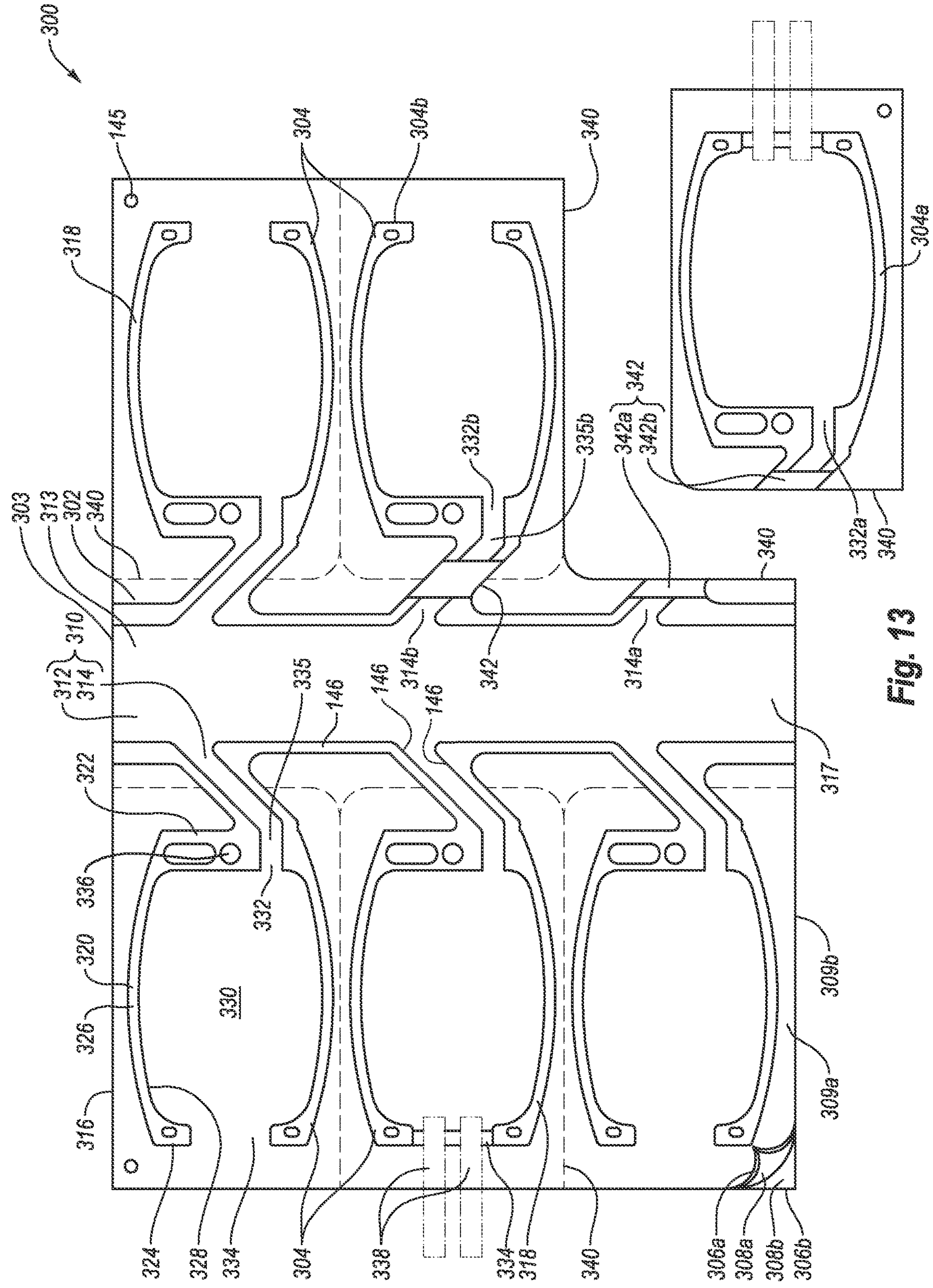
FIG. 13 is a top plan view of a manifold system according to another embodiment in which the receiving containers are also formed from the opposing sheets.

In embodiments of the fluid manifold system described above, the manifolds are comprised of at least a pair of sheets selectively welded together and the manifolds are fluidly attached to receiving containers using connectors. In an alternative embodiment, the receiving containers or at least the flexible bodies thereof can be integrally formed as a unitary structure with the manifold or flexible body thereof instead of being separately attached thereto by connectors. For example, FIG. 13 depicts a fluid manifold system 300 having a manifold 302 and receiving containers 304 that are formed within the same sheets by selective welding or the like.

Similar to embodiments of manifolds discussed above, manifold 302 has a flexible body 303 comprised of a pair of flexible sheets 306*a* and 306*b* with inside surfaces 308*a* and 308*b* facing each other and opposing outside surfaces 309*a* and 309*b*. A fluid flow path 310 is formed within manifold 302 by seam lines 146, as discussed above, that are formed by welding or otherwise securing together flexible sheets 306*a* and 306*b*. Fluid flow path 310 comprises a main flow path 312 extending from a fluid inlet 313 and a plurality of secondary flow paths 314 extending therefrom. Body 303 can have inlet coupler 150 (FIG. 3) secured at fluid inlet 313. However, instead of secondary flow paths 314 extending all the way to a perimeter edge 316 of the sheets, secondary flow paths 314 extend to receiving containers 304 formed from the same sheets 306*a* and 306*b*. As shown in FIG. 13, main flow path 312 can extend to an extender outlet 317 to allow manifold 302 to be connected in series to other manifolds, as discussed above. Alternatively, extender outlet 317 can be sealed or omitted so that no fluid will pass therethrough.

By being formed from the same sheets as manifold 302, receiving containers 304 are flexible and can also be referred to as flexible bags. Each receiving container 304 can be formed in the same way that the manifolds discussed herein are formed. That is, each receiving container 304 can be formed by selectively welding flexible sheets 306*a* and 306*b* to form seam lines 318 that outline the perimeter of receiving container 304.

Similar to receiving containers 110, each receiving container 304 comprises a main body 320 extending from a proximal end 322 to a spaced apart distal end 324 and having an outer wall 326 with an inner surface 328 bounding a closed compartment 330. A fluid inlet 332 and a fluid outlet 334 respectfully extend through the proximal and distal ends 322 and 324 of outer wall 326 to fluidly communicate with compartment 330. A fluid pathway 335 is also formed that communicates with compartment 330 and extends toward manifold 302 from fluid inlet 332. Similar to receiving containers 110, one or more hanger holes 336 can also extend through main body 320.

Because receiving containers 304 are formed from the same sheets 306 as manifold 302, each secondary flow path 314 can be formed so as to seamlessly flow through fluid pathway 335 into a corresponding fluid inlet 332 without the use of couplers. That is, each secondary flow path 314 can be integrally formed with fluid pathway 335 and its corresponding fluid inlet 332. Thus, the flexible body of manifold 302 can be formed from a first portion of sheets 306*a* and 306*b* while the flexible body of the receiving containers 304 can be formed from a continuous second portion of sheets 306*a* and 306*b*.

Similar to receiving containers 110, one or more connectors can be welded or otherwise fluidly connected to fluid outlet 334 of body 320 of receiving container 304 to pass fluid out of compartment 330 after compartment 330 has been filled. Each connector can comprise a port, a tube, or the like, similar to other connectors discussed herein. For example, in the depicted embodiment, the connector comprises a pair of tubes 338 secured within fluid outlet 334 of receiving container 304. Tubes 338 can be welded, glued, fastened, or otherwise secured to receiving containers 304 at fluid outlet 334, similar to other tubes discussed herein.

If desired, manifold system 300 can include means for easily detaching receiving containers 304 from manifold 302 after the containers have been filled. For example, for each receiving container 304, a plurality of perforations 340 can extend through both sheets 306*a* and 306*b* in a line extending from the perimeter edge 316 of flexible sheets 306, around the corresponding receiving container 304, and back to perimeter edge 316. The exception is that perforations 340 are not formed across fluid flow path 310. As a result, each receiving container 304 can be detached from manifold 302 by simply tearing along perforations 340 corresponding to the receiving container 304, as has been done with receiving container 304*a*. As shown in the depicted embodiment, portions of perforations 340 can be shared by more than one receiving container 304.

Whether using perforations 340 or not, before detaching receiving container 304 from manifold 302, fluid inlet 332 of receiving container 304 and secondary flow path 314 of manifold 302 should be isolated and sealed from each other somewhere along fluid pathway 335. If both fluid inlet 332 and secondary flow path 314 are not sealed, fluid may leak out from receiving container 304 and/or manifold 302 when separated and contaminants may enter therein. In one embodiment, fluid inlet 332 and secondary flow path 314 are sealed by selective welding. This can be accomplished by welding the portions of sheets 306*a* and 306*b* corresponding to a location along fluid pathway 335 after passing the fluid from manifold 302 into receiving container 304. For example, in FIG. 13 fluid pathway 335*b* corresponding to receiving container 304*b* has been welded closed at weld seam 342. As depicted, the welding should be aligned with the perforations 340 corresponding to the receiving container 304. By so doing, when receiving container 304 is detached from manifold 302 by tearing along perforations 340, as is the case with receiving container 304A, a cut can be made across welded seam 342 so that a portion 342A of seam 342 can remain with manifold 302 while a separate portion 342*b* of seam 342 can go with receiving container 304A. This allows receiving container 304 and manifold 302 to both be sealed after separation. The cut can be made as part of the welding process or subsequent thereto.

Figure 14:
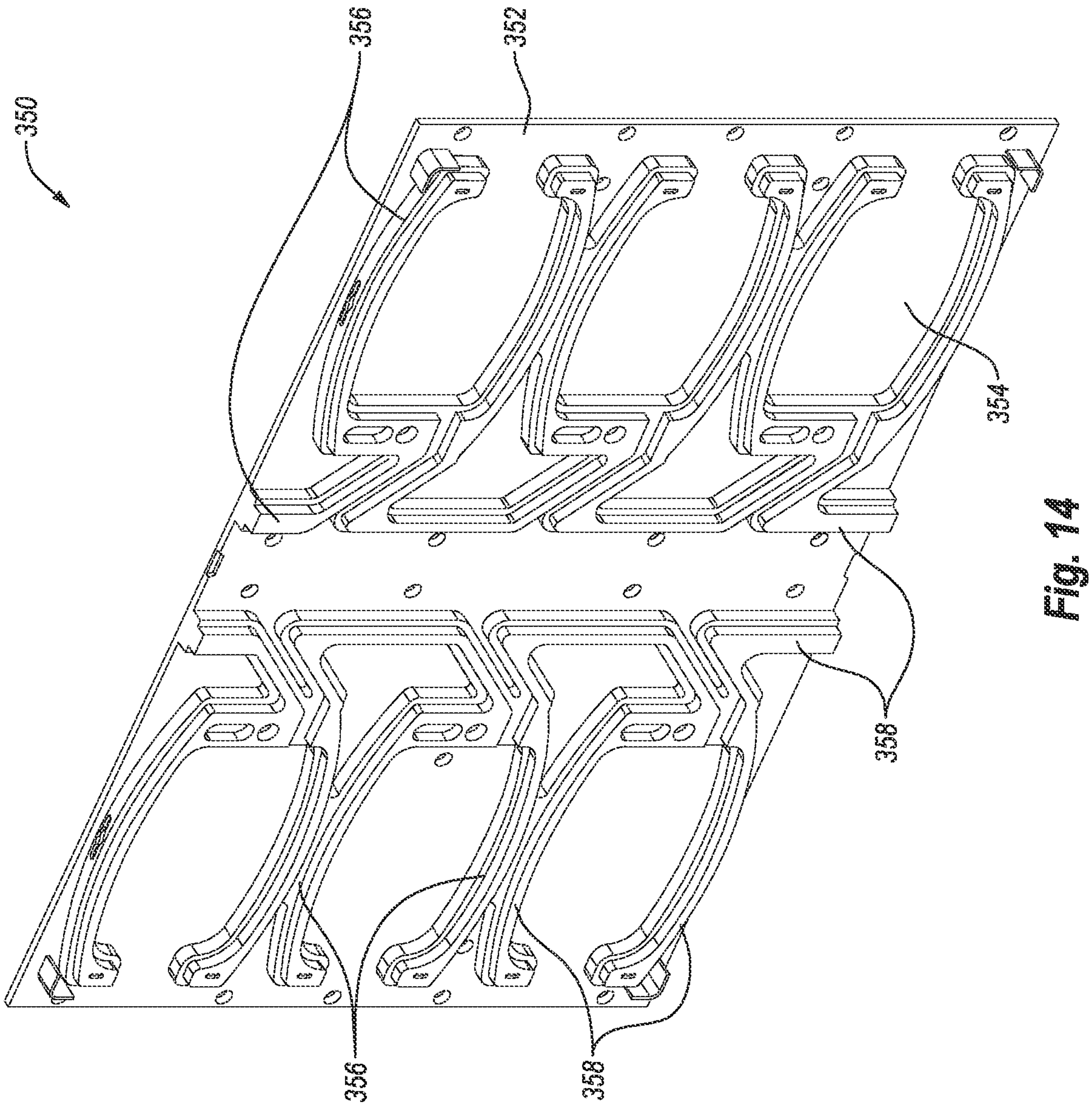
FIG. 14 is a perspective view of one embodiment of a weld plate that can be used to form the manifold system depicted in FIG. 13.

As noted above, the manifolds described herein can be formed by selectively welding two or more sheets together. Also as noted above, in some embodiments the receiving containers can also be formed by selectively welding within the same sheets. In one embodiment, a weld plate can be used to weld the sheets together as is known in the art. FIG. 14 shows an example of a weld plate 350 that can be used to form manifold system 300 shown in FIG. 13. Weld plate 350 comprises a plate 352 having a top surface 354. A number of raised portions 356 extend from top surface 354 of plate 352 to an outer surface 358.

Figure 15:
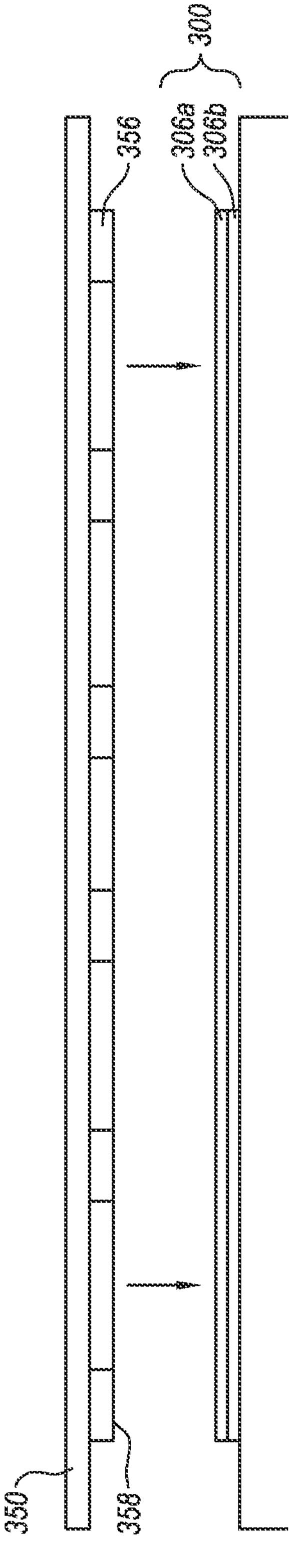
FIG. 15 is a side view showing one method of using the weld plate shown in FIG. 14 to weld a manifold system.

As shown in FIG. 15, weld plate 350 is configured so that outer surface 358 of raised portions 356 will contact the topmost sheet 306*a* during manufacture of manifold system 300 and conduct heat to sheets 306*a* and 306*b*. As a result, weld seams will be formed between sheets 306*a* and 306*b* only where outer surface 358 of weld plate 350 contacts top most sheet 306*a*. As such, outer surface 358 of weld plate 350 corresponds to the desired positions of the weld seams on the sheets 306*a* and 306*b*. Weld plate 350 is generally made of a metal but other materials that can conduct heat can also be used.

Figure 16:
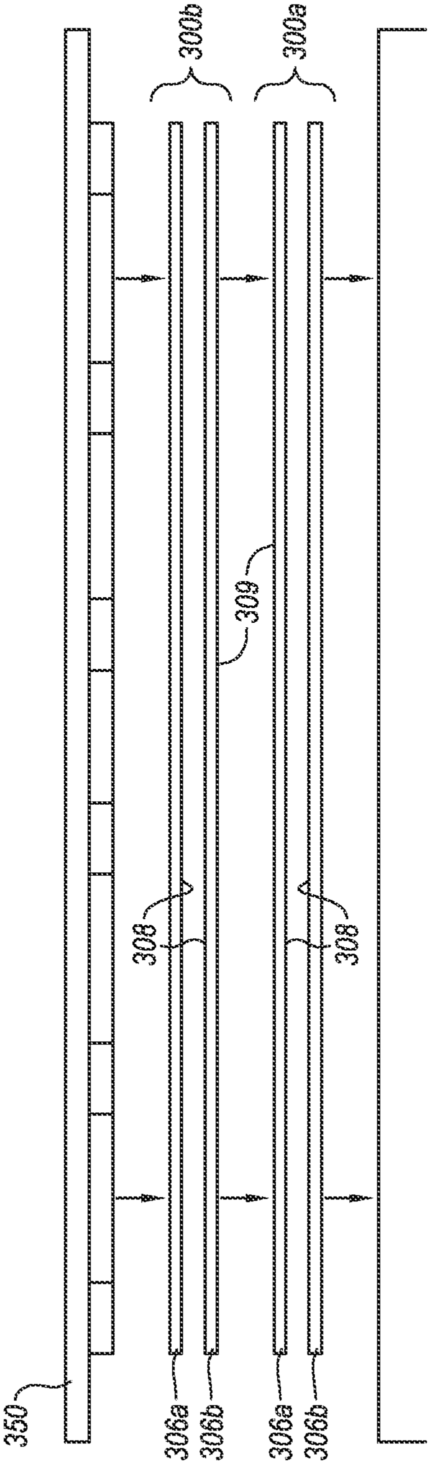
FIG. 16 is a side view showing a method of using the weld plate shown in FIG. 14 to concurrently weld multiple manifold systems.

In some embodiments, more than one manifold system can be manufactured simultaneously. For example, FIG. 16 shows a pair of manifold systems 300*a* and 300*b* that can be formed simultaneously using weld plate 350. As discussed above, each manifold system 300*a* and 300*b* includes a pair of sheets 306*a* and 306*b* having inner surfaces 308 and outer surfaces 309. As depicted, manifold systems 300*a* and 300*b* are stacked on top of each other so that bottom sheet 306*b* of manifold system 300*b* is positioned directly above top sheet 306*a* of manifold system 300*a*. In this embodiment, inner surfaces 308 are coated or made from a material that allows welding to occur, while outer surfaces 309 are coated or made from a material that precludes welding of the sheets together. As a result, when weld plate 350 is pressed against manifold system 300*b*, the heat from weld plate 350 passes through both manifold systems 300*a* and 300*b*, but only the inner surfaces 308 become welded together. As a result, when weld plate 350 is removed, the outer surfaces 309 of top sheet 306*a* of manifold system 300*a* and bottom sheet 306*b* of manifold system 300*b* are separable, thereby allowing manifold systems 300*a* and 300*b* to be separated. Although only two manifold systems 300*a* and 300*b* are depicted, it is appreciated that more than two manifold systems can be simultaneously formed in a similar manner.

Figure 17:
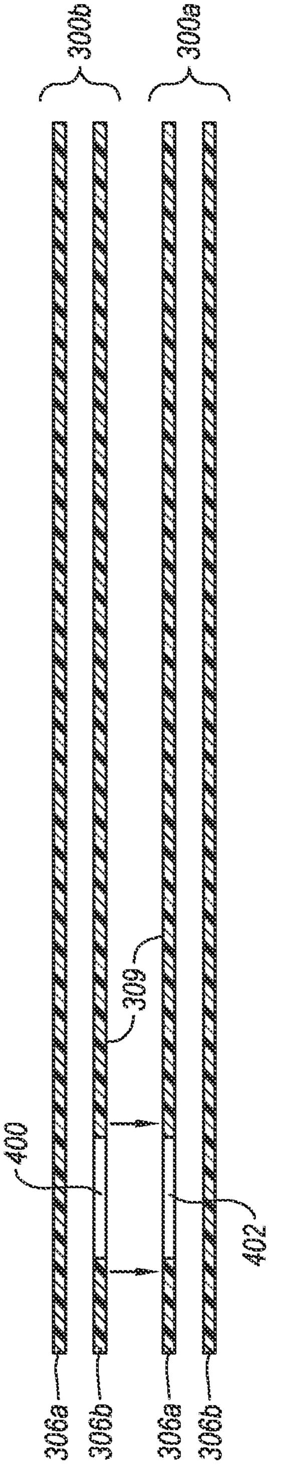
FIG. 17 is a side view showing a pair of manifold systems that can be welded together to form a port therebetween.

In addition, if desired, one or more ports can be formed between the simultaneously formed manifold systems. For example, in the embodiment shown in FIG. 17, a portion of top sheet 306*a* of manifold system 300*a* and a portion of bottom sheet 306*b* of adjoining manifold system 300*b* are removed so as to form apertures 400 and 402 on each sheet that align with each other. The portions of the outer surfaces 309 of both sheets 306*a* and 306*b* that surround apertures 400 and 402 are then coated with a material that allows welding to occur, after which the coated outer surfaces 309 are welded together surrounding apertures 400 and 402. This welding of outer surfaces 309 can occur concurrently with forming the manifold systems using weld plate 350, or it can be done some time thereafter. If it is done concurrently, then apertures 400 and 402 are formed before forming of the manifold systems. The welding together of apertures 400 and 402 permits fluid communication between manifold systems 300*a* and 300*b*. In this embodiment and the below discussed embodiments, apertures 400 and 402 are typically formed on a portion of the manifold 302 (FIG. 13) of the manifold systems. As such, fluid can be delivered in series to the different manifolds 302 which can then be delivered to the different receiver containers.

Figure 18:
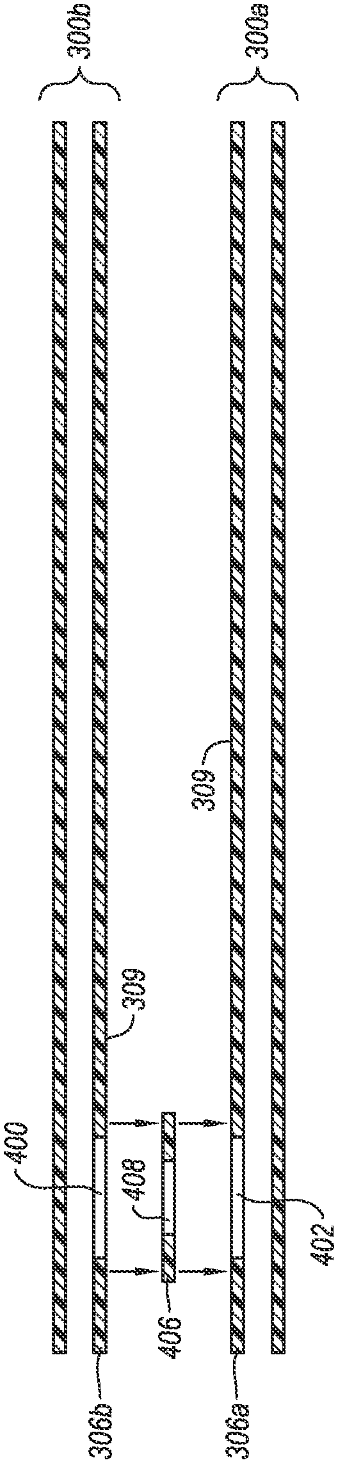
FIG. 18 is a side view showing the pair of manifold systems shown in FIG. 17 having a coupling material disposed therebetween.

In an alternative embodiment shown in FIG. 18, a coupling material 406 is positioned between manifold systems 300*a* and 300*b* so as to cover apertures 400 and 402 on both sheets 306*a* and 306*b*. The coupling material 406 also bounds an aperture 408 extending therethrough. The coupling material 406 can be circular or any other shape that can encircle apertures 400 and 402. The coupling material 406 is comprised of a material that can be welded to both outer surfaces 309 of top and bottom sheets 306*a* and 306*b* or is coated with a weldable coating. The coupling material 406 is positioned so that aperture 408 aligns with apertures 400 and 402 in top and bottom sheets 306*a* and 306*b* and then is welded to both sheets in a conventional manner. As with the prior embodiment, welding can occur concurrently with the formation of the manifold systems using weld plate 350 or can be done some time thereafter.

Figure 19A:
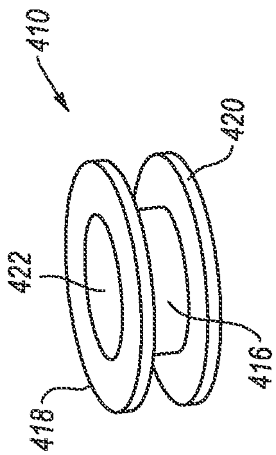
FIG. 19A is a perspective view showing a connector used to couple manifold systems together.
Figure 19B:
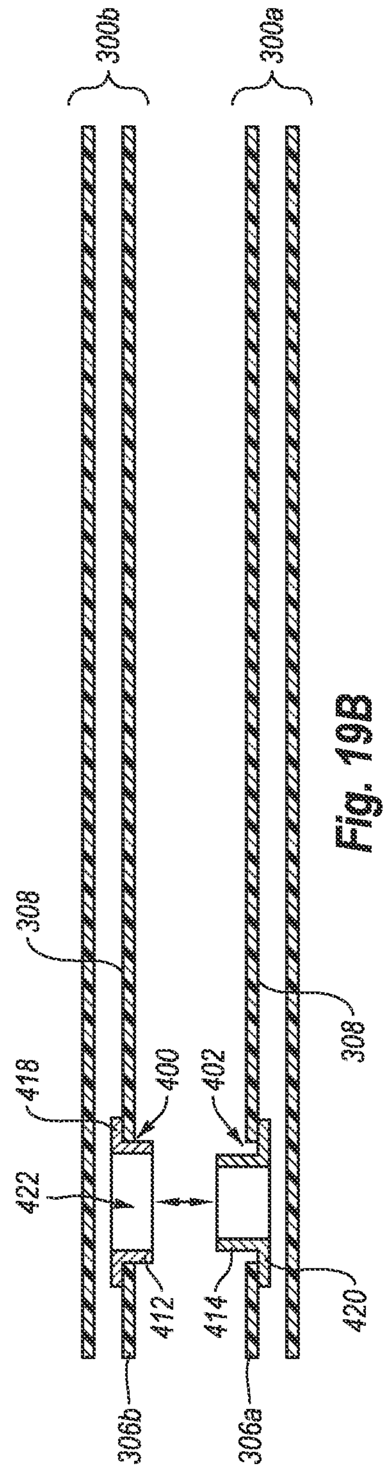
FIGS. 19B and 19C are side views showing the pair of manifold systems shown in FIG. 17 being coupled by an embodiment of the connector shown in FIG. 19A.
Figure 19C:
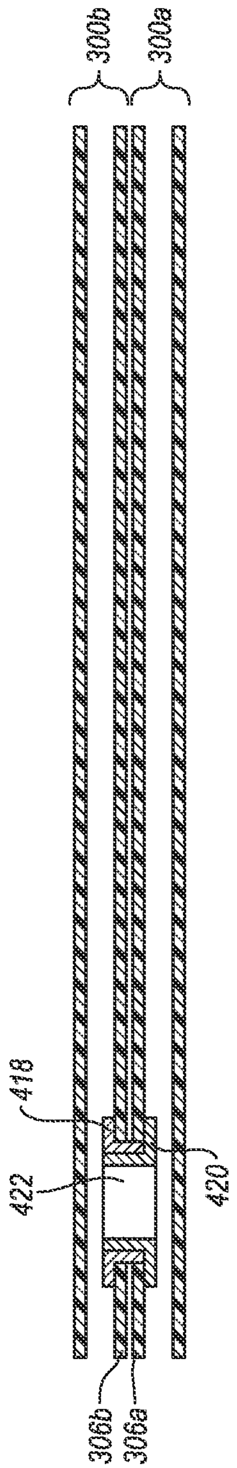

In another embodiment shown in FIGS. 19A-C, a rigid or substantially rigid connector 410 can be used to attach the adjoining manifold systems 300*a* and 300*b* together through apertures 400 and 402. Connector 410 can be a single integral unit as shown in FIG. 19A, or can be comprised of multiple portions 412 and 414 that are attached together, as shown in FIGS. 19B and 19C. As shown in FIG. 19A, connector 410 comprises a hollow stem 416 that extends between annular flanges 418 and 420 that radially extend outward from stem 416. A passageway 422 extends all the way through stem 416 between the two flanges 418 and 420. Each flange 418, 420 is positioned against the inner surface 308 of the top and bottom sheets 306*a* and 306*b* of adjoining manifold systems 300*a* and 300*b* so that stem 416 extends between the manifold systems through apertures 400 and 402.

As shown in FIG. 19C, when assembled, the manifold systems 300*a* and 300*b* are fluidly coupled together through passageway 422. Flanges 418 and 420 are welded to inner surfaces 308 either during formation of the manifold systems by weld plate 350, or at some other time, using a known welding technique. In the depicted embodiment, connector 410 is comprised of two separate portions 412 and 414 that are first inserted through apertures 400 and 402 as shown in FIG. 19B and then attached together by adhesive, welding, or other attachment method, as shown in FIG. 19C. The single, integral connector 410 can be used if the manifold top and bottom sheets 306*a* and 306*b* are flexible and/or expandable.

Although each method of coupling manifold systems together discussed above with regard to FIGS. 17-19 are directed to a single coupling through apertures 400 and 402, it is appreciated that multiple apertures can be coupled between manifold systems. For example, if desired, each receiving container 304 of one manifold system 300 can be coupled to a corresponding receiving container 304 in an adjacent manifold system using the above methods. It is also appreciated that a different method can be used for each coupling if desired.

Although weld plate 350 corresponds to manifold system 300, it is appreciated that other weld plates can be used that correspond to any of the other manifold systems described herein, including those in which the receiving containers are not formed with the manifolds.

Figure 20A:
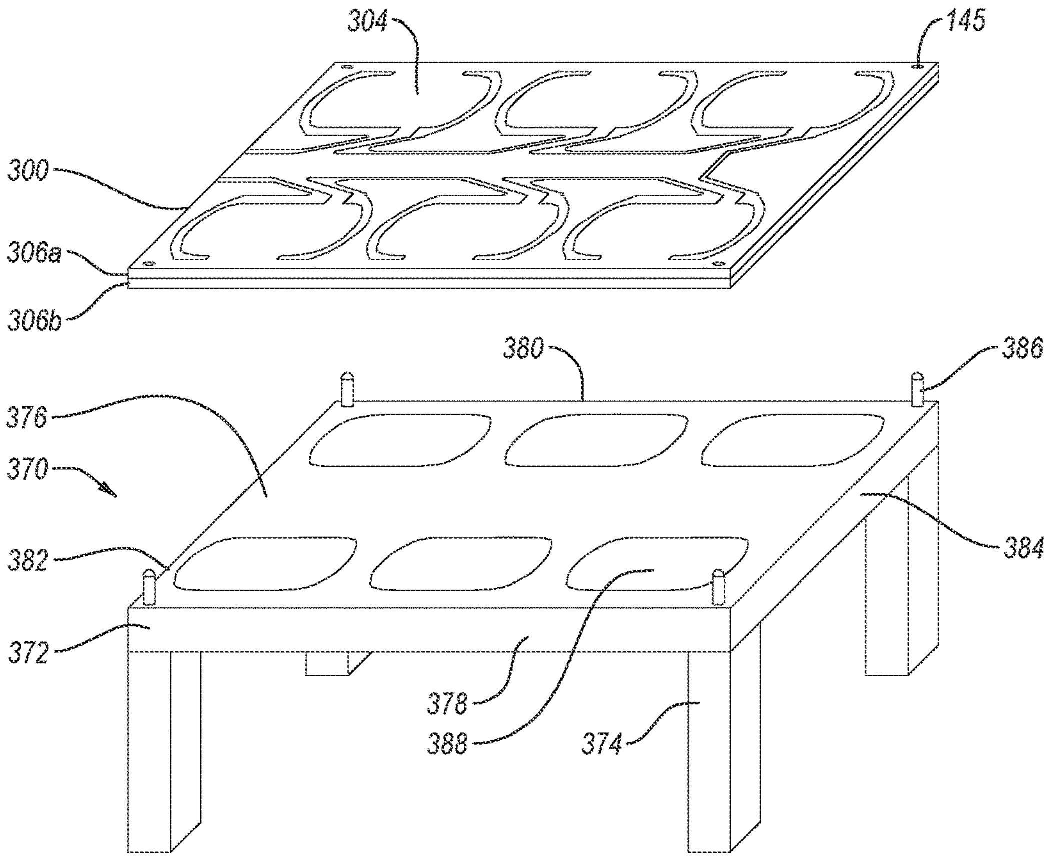
FIGS. 20A-20B disclose a table that can be used with the manifold system according to one embodiment.

FIG. 20A shows a table 370 that can be used with manifold system 300 according to one embodiment of the present invention. Although table 370 is designed to be used with manifold system 300, it is appreciated that table 370 can be adapted to be used with any of the manifold systems described or envisioned herein.

Table 370 comprises a top member 372 supported on one or more legs 374. Alternatively, top member 372 can be used without any legs 374, if desired. Top member 372 has a top surface 376 extending between two lateral sides 378, 380 and two ends 382, 384. One or more manifold positioning aids can be used to aid in positioning the manifold system. As sheets 306 that make up manifold system 300 may be quite flexible, having a manifold positioning aid can help in flattening out sheets 306 and optimally positioning manifold system 300 on table 370. For example, in the depicted embodiment four aligning posts 386 extend up from top surface 376 and are positioned so that aligning holes 145 of manifold system 300 are aligned with aligning posts 386 when manifold system 300 is placed on table 370. Other types of manifold positioning aids, such as clamps, adhesive, connectors or the like can also be used as the manifold positioning aids.

If desired, one or more measuring devices can be included in table 370 to determine how much fluid has been loaded into each receiving container. For example, table 370 can include a plurality of load cells 388, positioned on table 370 so as to be aligned with the corresponding receiving containers 304 formed on manifold system 300. Each load cell 388 can act as a scale to determine the weight of the corresponding receiving container 304 as receiving container 304 is filled. As such, the amount of fluid loaded into each receiving container 304 can be limited to a predetermined amount by stopping the flow of fluid into the receiving container as soon as the predetermined weight has been met. In alternative embodiments, flow meters or other measuring devices can be used.

Figure 20B:
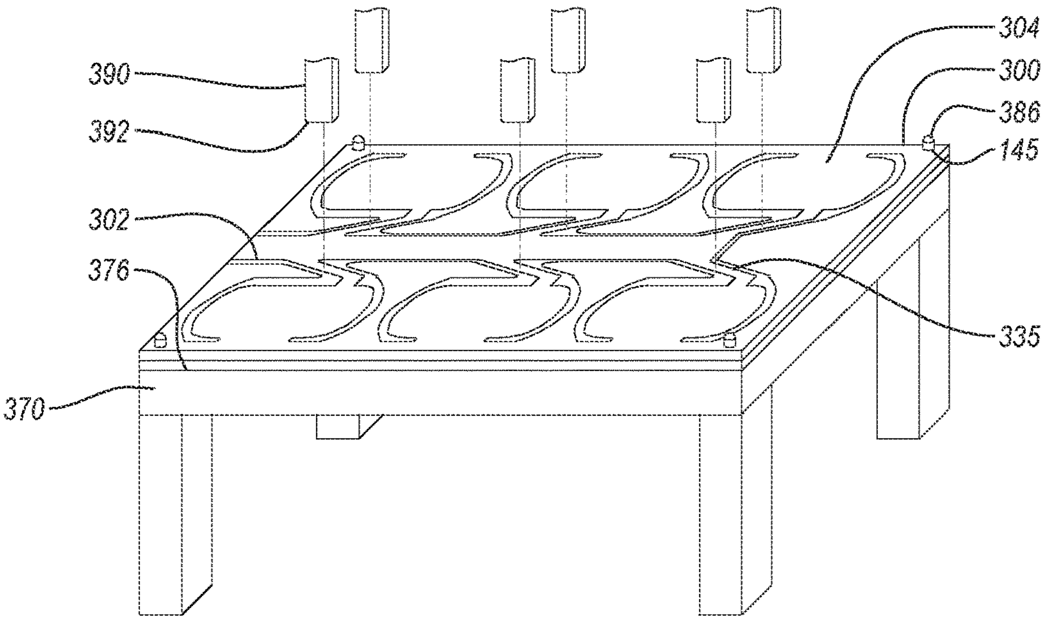

As shown in FIG. 20A, manifold system 300 can be lowered onto top surface 376 of table 370 so that aligning posts 386 are received within aligning holes 145, as shown in FIG. 20B. When manifold system 300 is positioned thusly, load cells 388 can lie directly under receiving containers 304. As noted above, other positioning aids, such as clamps, adhesives, connectors, or the like can also be used to position manifold system 300 on table 370.

Once manifold system 300 has been positioned on table 370, fluid can be passed through manifold 302 and into receiving containers 304. If a measuring device is used, such as, e.g., load cells 388, the flow of fluid into any receiving container 304 can be cut off when the measurement of the receiving container 304 reaches a predetermined amount. The cut off of fluid can be accomplished by using a restricting device, such as one or more pinch offs 390, as shown in FIG. 20B. Each pinch off 390 extends to a distal end 392 that can be positioned over fluid pathway 335. When the cut off point is reached, as determined by the measuring device, pinch off 390 can be activated, causing pinch off 390 to be lowered onto manifold system 300 with enough force to pinch fluid pathway 335, thereby stopping the flow of fluid into corresponding receiving container 304.

Due to potentially different flow rates into each receiving container 304, the time required to reach the cut off point may vary between different receiving containers. To take this into account, a separate pinch off 390 can be positioned over fluid pathways 335 corresponding to each receiving container 304 and activated at different times. It is appreciated that variable pressures can be used with pinch offs 390 to slow the flow of fluid rather than completely stop the flow, if desired. Pinch offs 390 can also be used if only a subset of the receiving containers 304 are desired to be filled. For example, if only four of the six receiving containers 304 of manifold system 300 are needed to be filled, pinch offs 390 corresponding to two of the receiving containers 304 can be activated to prevent any fluid from flowing into the particular receiving containers 304. In addition, pinch offs 390 can also be used with manifold systems in which the receiving containers are not formed integrally with the manifold.

FIGS. 21A-21D disclose a method of dispensing a fluid using manifold system 300 according to one embodiment of the present invention. Although the method is directed to manifold system 300, it is appreciated that the method steps can apply to any of the manifold systems described or envisioned herein.

Figure 21A:
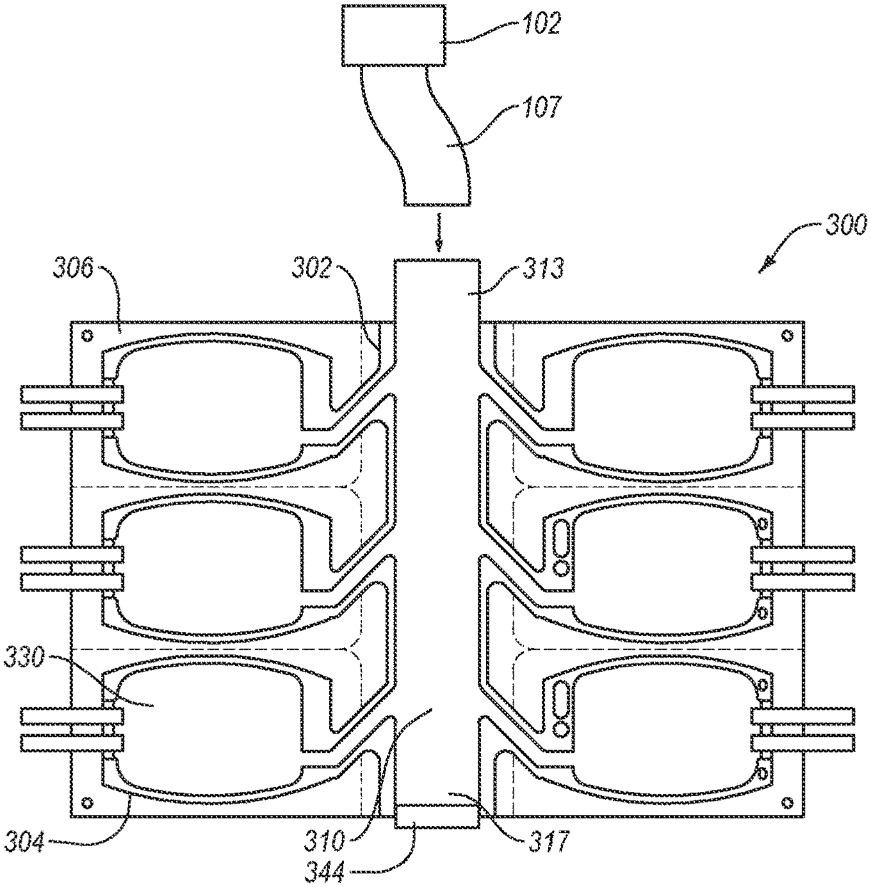
FIGS. 21A-21D disclose a method of dispensing a fluid according to one embodiment.

Manifold system 300 can be first positioned as desired. For example, manifold system can be positioned on table 370 as shown in FIG. 20B, with or without the help of a manifold positioning aid, such as aligning posts 386. Turning to FIG. 21A, a fluid source, such as dispensing container 102 is fluidly coupled via conduit 107 to manifold system 300, which is formed from opposing flexible sheets 306, as discussed above. As noted above, a pump may be used, if desired to control the flow of fluid into manifold system 300. Also as discussed above, manifold system has a manifold 302 and a plurality of receiving containers or bags 304 formed within flexible sheets 306. Fluid flow path 310 extends from fluid inlet 313 to a compartment or chamber 330 of each of the flexible bags 304. If fluid flow path 310 extends to an extender outlet, such as extender outlet 317, manifold system 300 can be connected serially to other manifolds. Alternatively, extender outlet 317 can be sealed closed, as discussed above. For example, in the depicted embodiment, a plug 344 is positioned within extender outlet 317.

Figure 21B:
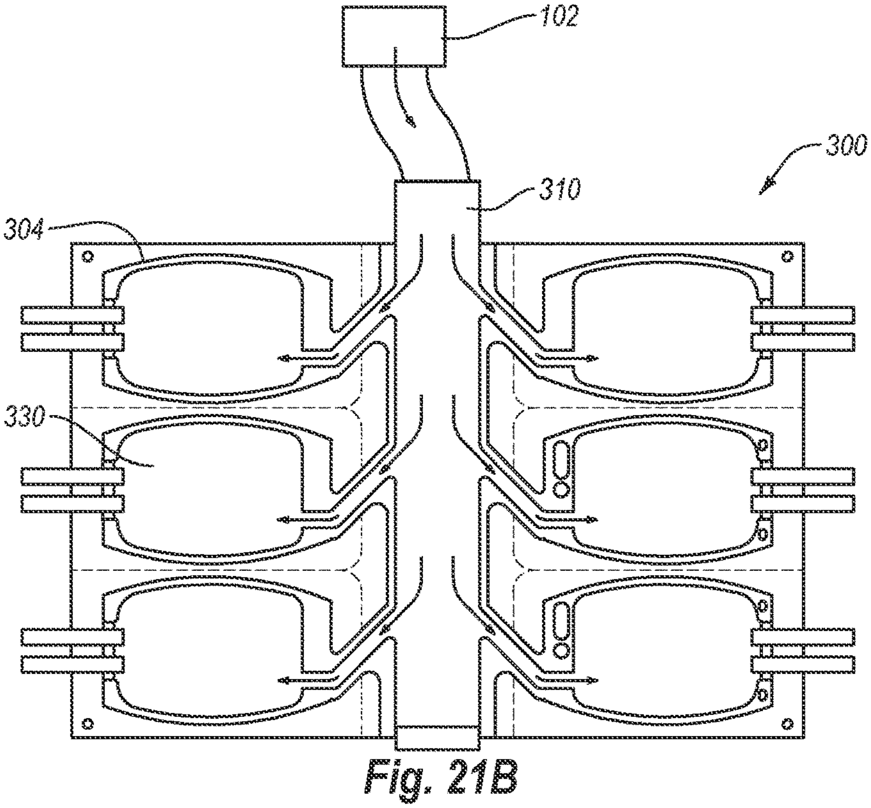

Turning to FIG. 21B, once the dispensing container 102 is fluidly coupled to manifold system 300, a fluid is then passed from fluid source 102 through fluid flow path 310 and into chambers 330 of flexible bags 304 through fluid flow path 310. This occurs until a desired amount of fluid has been passed into each chamber 330. As noted above, a restricting apparatus can be used to stop or slow the flow into any of the flexible bags 304. For example, as discussed above, one or more pinching members, such as pinch off 390 (FIG. 20B) can be used to pinch the secondary flow path 314 corresponding to the flexible bag 304 for which slowing of the flow is desired.

Figure 21C:
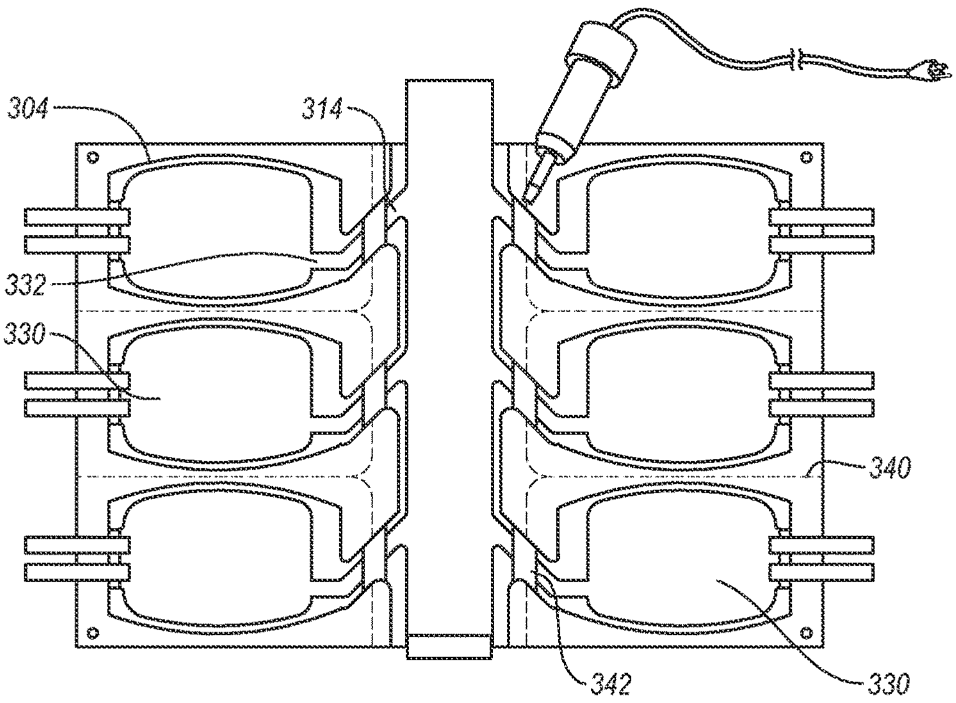

Turning to FIG. 21C, once chambers 330 are filled with fluid to the desired amount, secondary flow path 314 corresponding to each flexible bag 304 is sealed closed at intersection 342 so that each chamber 330 is sealed closed. As discussed above, this can be done by welding, as depicted in FIG. 21C, or by any other sealing method known in the art. In embodiments in which receiving containers are not integrally formed with the manifold, the tubes extending between the receiving container and the manifold, such as tubes 180 shown in FIG. 6, can be welded closed. If external connectors are used, such as aseptic connector 186 shown in FIG. 8, additional sealing may not be required.

Figure 21D:
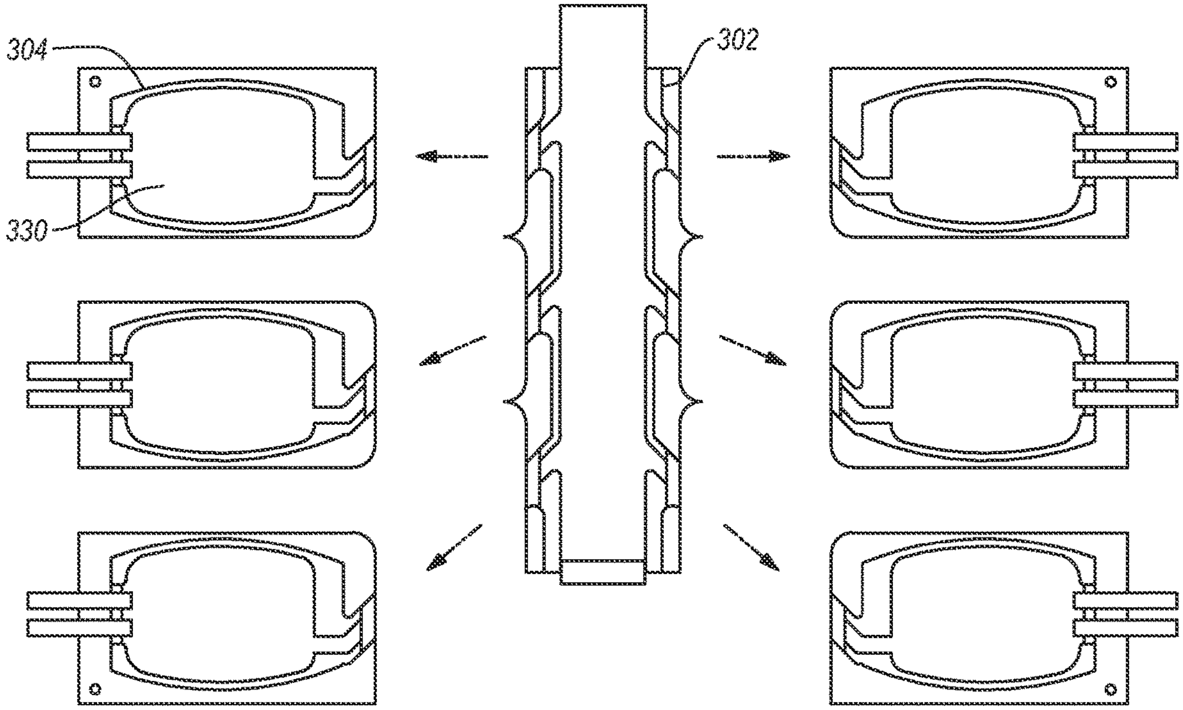

Turning to FIG. 21D, once each chamber 330 has been filled and sealed, each flexible bag 304 is then removed from manifold 302. As discussed above, this can be done by tearing flexible sheets 306*a* and 306*b* at perforations 340 (FIG. 21C). Other separation methods can also be used. For example, scissors or other sharp apparatus can be used to cut sheets 306*a* and 306*b* to separate flexible bags 304 from manifold 302. In embodiments in which receiving containers are not integrally formed with the manifold, scissors can also be used to cut tube 180 where tube 180 is sealed. If external connectors are used, the connectors may be able to be separated without cutting or tearing.

Figure 22:
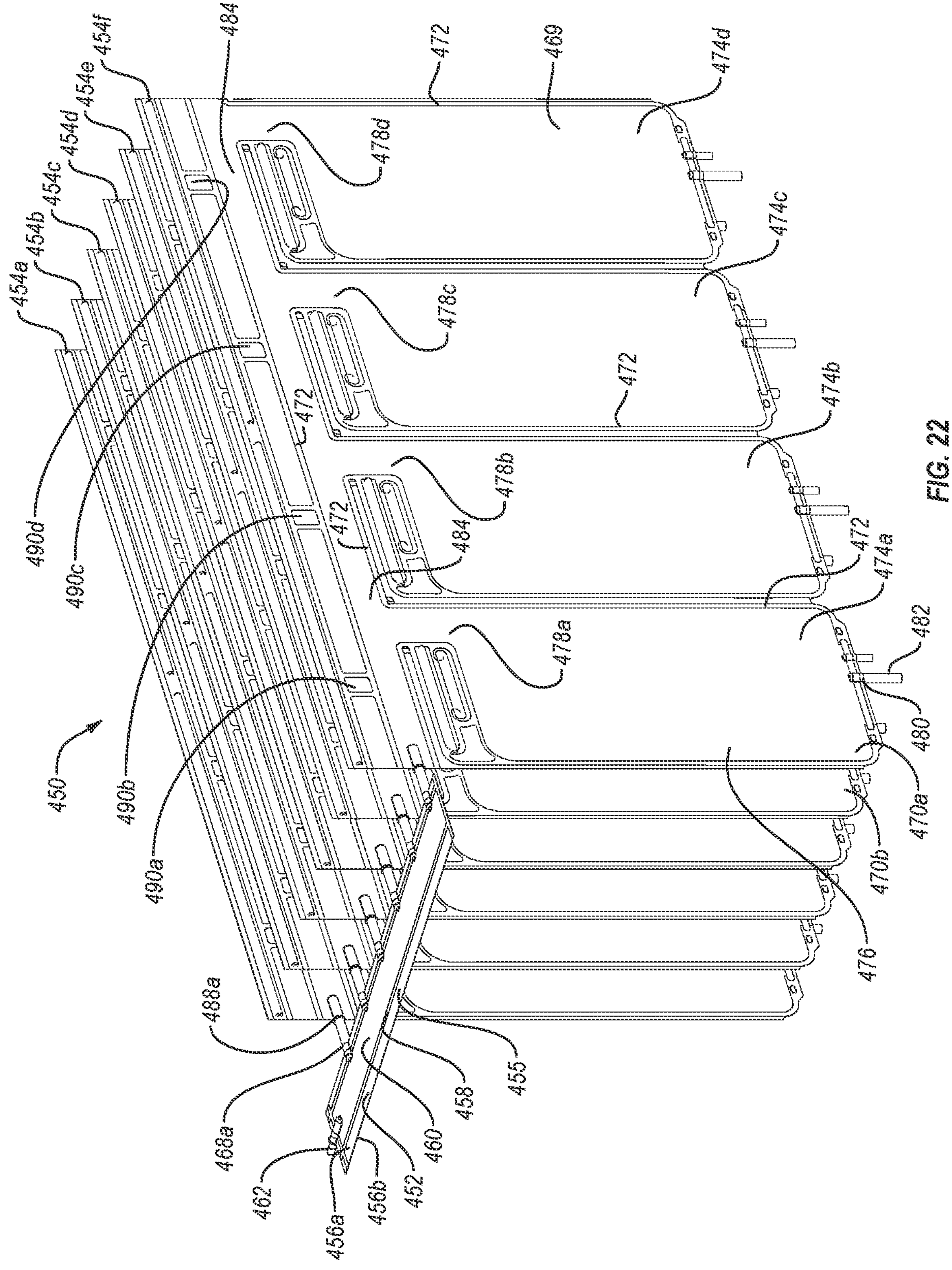
FIG. 22 is a perspective view of an alternative embodiment of a fluid manifold system wherein receiving container assemblies can be vertically oriented for supporting on a rack.

Depicted in FIG. 22 is another alternative embodiment of a fluid manifold system 450 incorporating features of the present invention. Manifold system 450 comprises a manifold 452 and a plurality of receiving container assemblies 454*a*-454*f* that are fluid coupled to manifold 452 at spaced apart locations. Any desired number of receiving container assemblies can be attached to manifold 450. As with previously discussed manifolds, manifold 452 includes a flexible body 455 that is comprised of a first flexible sheet 456*a* that overlaps a second flexible sheet 456*b*. Sheets 456*a* and *b* are welded together to form seam lines 458 that bound a primary fluid path 460 extending along the length of body 455.

Figure 23:
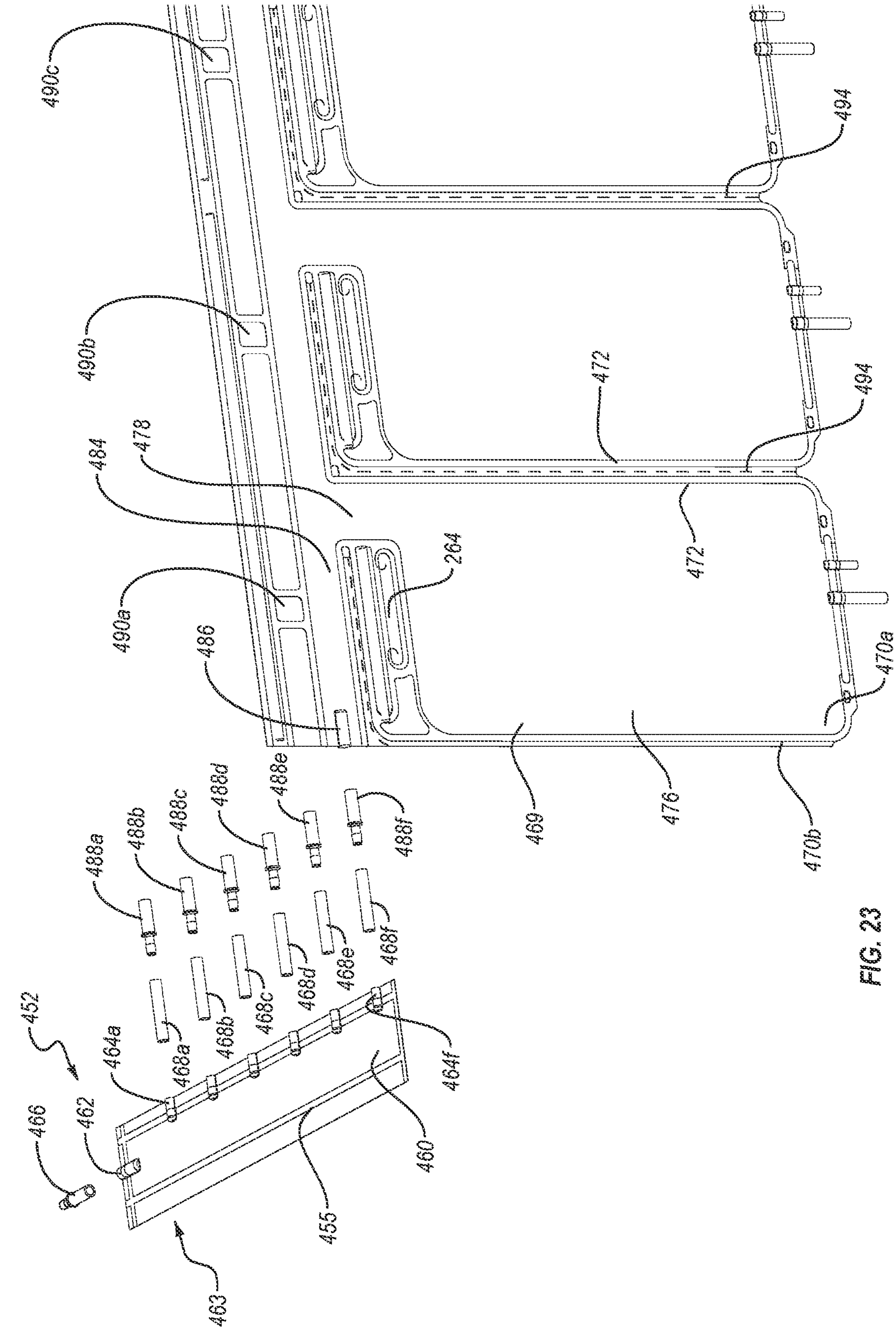
FIG. 23 is a perspective partially exploded view of the fluid manifold system shown in FIG. 22.

As depicted in FIG. 23, manifold 452 further comprises a fluid inlet 462 formed at a first end 463 of body 455 and a plurality of spaced apart fluid outlets 464*a-f* formed at spaced apart locations along a side edge of body 455. Each inlet 462 and outlet 464 is bounded between sheets 456*a* and *b* and communicates with primary fluid path 460. A tubular inlet connector 466 is received within fluid inlet 462 while tubular outlet connectors 468*a-f* are received within corresponding fluid outlet 464*a-f*. Inlet connector 466 and outlet connectors 468 can be welded or otherwise secured between sheets 456*a* and *b* and are in fluid communication with primary fluid path 460. In one embodiment, inlet connector 466 is a rigid, barbed stem while outlet connectors 468 are flexible tubes that all outwardly project from body 455. In other embodiments, alternative connectors can be used.

Returning to FIG. 22, each receiving container assembly 454 includes a flexible body 469 that comprises a pair of overlapping flexible sheets 470*a* and 470*b* that have been welded together to form seam lines 472. The seam lines 472 bound four separate receiving containers 474*a-d* that each bound a compartment 476. Any desired number of receiving containers 474 can be formed. The seam lines 472 also bound, for each receiving container 474, a fluid inlet 478 that communicates with compartment 476 and a fluid outlet 480 that likewise communicates with compartment 476. A tube 482, fluid line or other connector is secured within fluid outlet 480 for dispensing fluid out of compartment 476.

Seam lines 472 also form a secondary fluid path 484 that extends along an upper edge of body 469 so as to communicate with each fluid inlet 478 of each receiving container 474. As depicted in FIG. 23, a fluid inlet 486 communicates with secondary fluid path 484 through a side edge of body 469. A tubular inlet connector 488 is secured within fluid inlet 486. In a depicted embodiment, inlet connector 488 comprises a bared stem that is more rigid than outlet connectors 468 of manifold 452. As a result, during assembly, each inlet connector 488 that is coupled to a corresponding receiving container assembly 454 can be pushed into a corresponding outlet connector 468 on manifold 452 to form a sealed fluid connection therebetween.

As shown in FIG. 22, a plurality of spaced apart openings 490*a-d* laterally pass through the upper edge of body 469 of each receiving container assembly 454. Openings 490 enable receiving container assemblies 454 to be mounted in spaced apart alignment on a rack so that the receiving container assemblies 454 can be vertically suspended in the orientation as depicted in FIG. 22 and manifold 452 can be horizontally positioned. This orientation and use of the rack facilitates easy organization, filling, sealing, removal, and other processing of receiving containers 474. The rack can comprise rods that laterally pass through aligned openings 490 of the different receiving container assemblies 454 or can comprise rods that have a catch, such as a hook, that is received within each opening 490. Other rack configurations can also be used. Reinforcing rods can be embedded within the upper edge of each body 469 above openings 490 to prevent openings 490 from tearing out as receiving containers 474 are filled with fluid.

Once fluid manifold system 450 is fully assembled, as depicted in FIG. 22, and sterilized, manifold 452 can be supported on a rack and fluid inlet 462 of manifold 452 can be fluid coupled with dispensing container 102 (FIG. 1). In one method for filling, primary fluid path 460 can be clamped closed between outlet connectors 468*a* and *b* and secondary fluid path 484 on receiving container assembly 454*a* can be clamped closed between fluid inlet 478*a* and 478*b*. Fluid then travels from dispensing container 102, into manifold 452, into secondary fluid path 484 of receiving container assembly 454*a* and then finally into chamber 476 of receiving container 474*a*. Once receiving container 474*a* is filled with a desired volume of fluid, fluid inlet 478*a* is sealed closed such as by forming a seam line or otherwise welding together sheets 470*a* and *b* that bound fluid inlet 478*a*. Secondary fluid path 484 is then unclamped between fluid inlets 478*a* and 478*b* and clamped closed between fluid inlets 478*b* and 478*c*. As a result, the fluid now flows from manifold 452 into chamber 476 of second receiving container 474*b*. The process is then repeated until all of receiving containers 474*a-d* of first receiving container assembly 454*a* are filled to a desired volume and all of fluid inlets 478*a-d* are sealed closed.

Next, the clamp on manifold 452 can be moved to between fluid outlets 468*b* and *c*. The same process as described above can now be used to sequentially fill each of receiving containers 474*a-d* of second receiving container assembly 474*b*. The above process can then be used to subsequently fill each of the receiving containers 474*a-d* of each of the subsequent receiving container assemblies 454. Prior to the filling of the last receiving container 474, the fluid within primary fluid path 460 and/or the secondary fluid path 484 can be pushed into the final receiving container 474 by passing a squeegee, roller or other tool, as previously discussed, over primary fluid path 460 and/or the secondary flow path 484 and forcing the fluid to flow into of the last receiving container 474. As a result, only a minimal amount of unused fluid remains within primary fluid path 460 and/or the secondary flow path 484 when the filling process is completed. Once a receiving container 474 is filed and sealed closed, the receiving container can be separated from the other receiving containers by cutting across the sealed inlet opening 478 and tearing along perforations 494 located between seam lines 472 between the different receiving containers 474 and between secondary flow path 484 and the receiving container 474.

Figure 24:
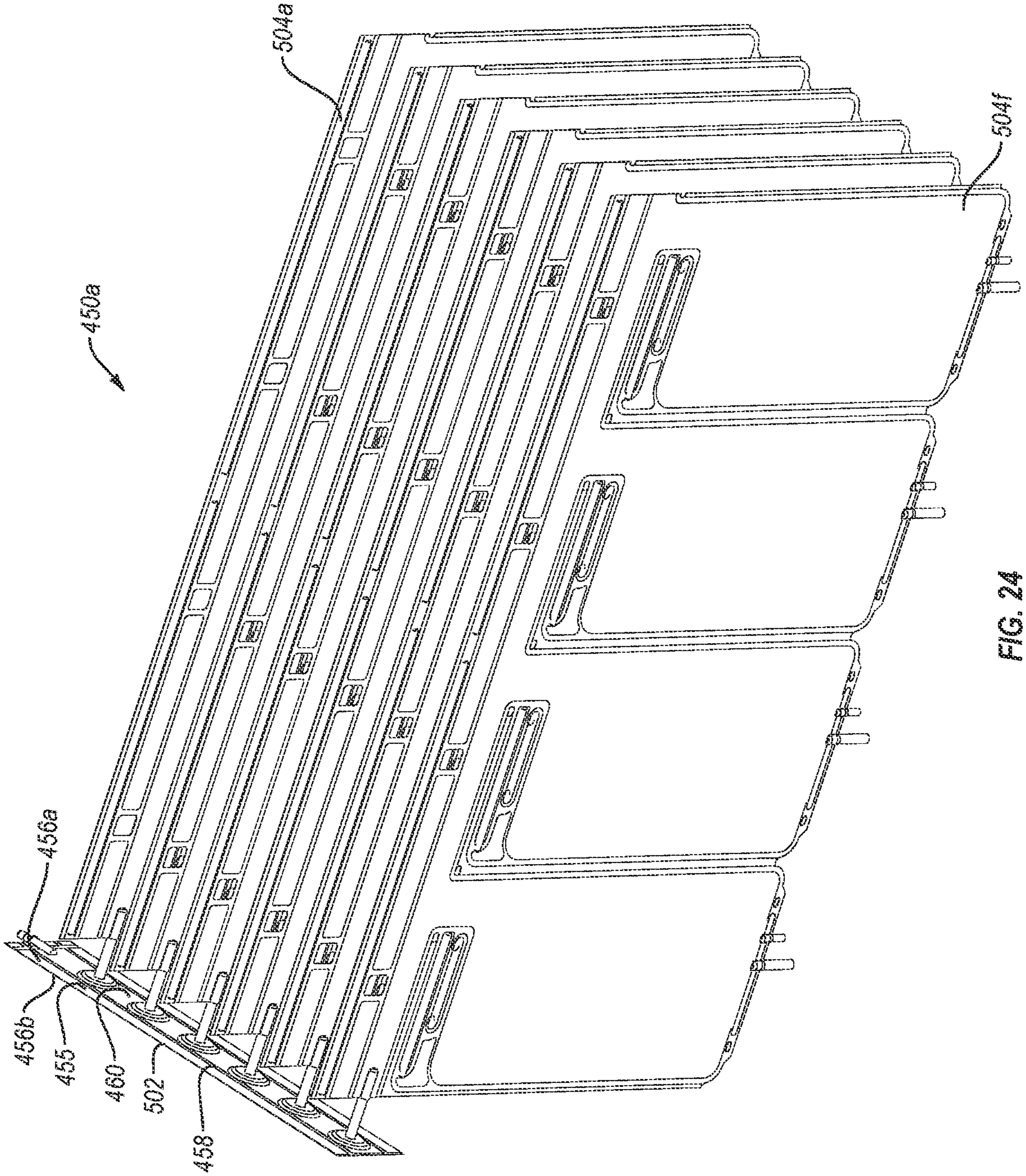
FIG. 24 is a perspective view of an alternative embodiment of the fluid manifold system shown in FIG. 22 wherein the manifold has a different connection to the receiving container assemblies.
Figure 25:
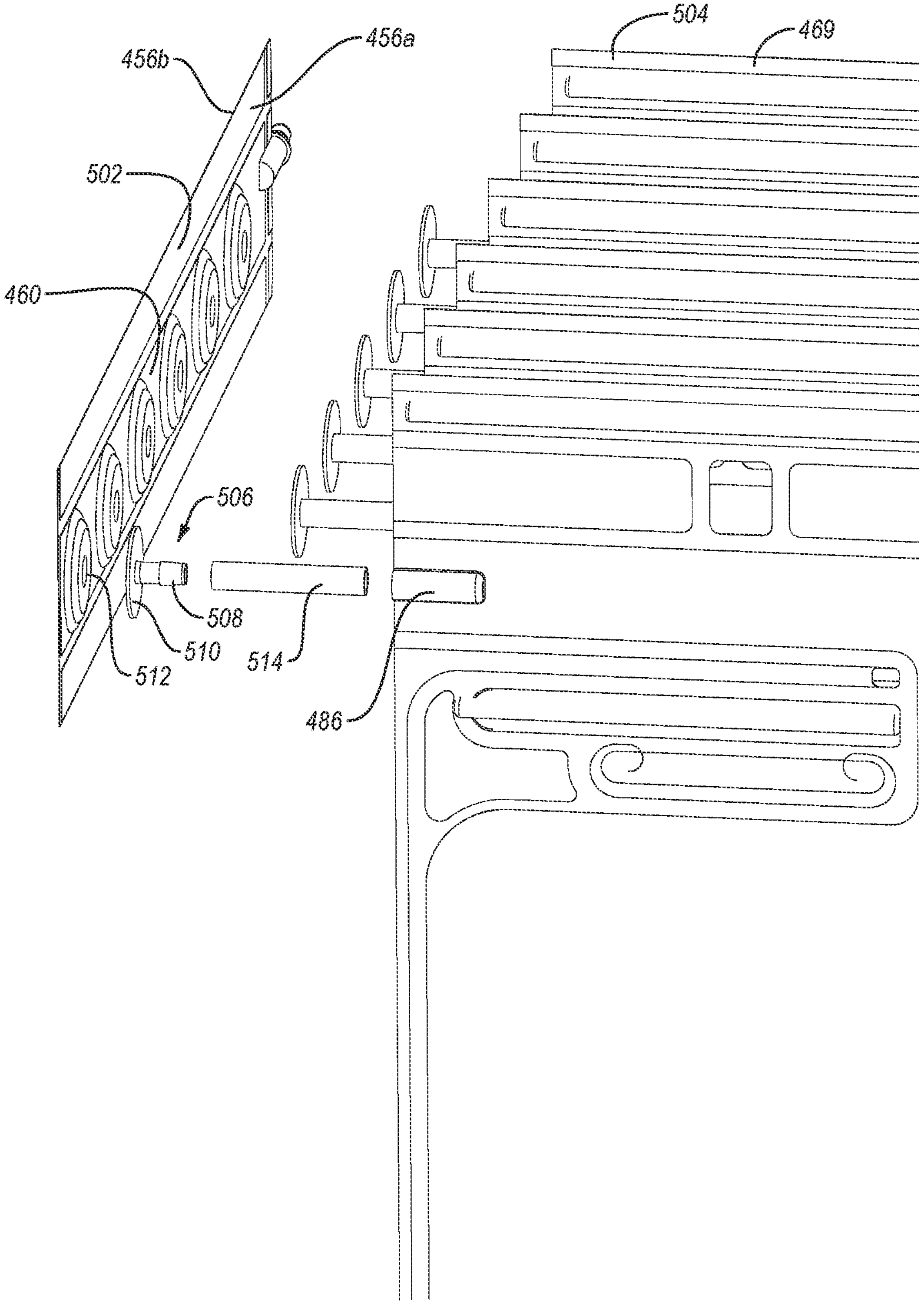
FIG. 25 is a perspective partially exploded view of the fluid manifold system shown in FIG. 24.

Depicted in FIG. 24 is an alternative embodiment of a fluid manifold system 450A incorporating features of the present invention. Like elements between fluid manifold system 450 and 450A are identified by like reference characters. Fluid manifold system 450A includes a manifold 502 and a plurality of receiving container assemblies 504*a-f* that are fluid coupled to manifold 502 along the length thereof. Similar to manifold 452, manifold 502 includes flexible body 455 having seam lines 458 that bound a primary fluid path 460. However, in contrast to having outlet connectors 468 that are welded between flexible sheets 456*a* and *b*, manifold 502 includes outlet connectors 506 that, as depicted in FIG. 25, include a barbed stem 508 having a flange 510 radially outwardly projecting from an end thereof. Flange 510 is welded or otherwise secured to an interior surface of sheet 456A so that stem 508 passes through a fluid outlet 512 that communicates with primary fluid path 460.

In turn, receiving container assemblies 504 each include flexible body 469 as previously discussed. However, in contrast to using inlet connectors 488 that are in the form of rigid tubular stems, receiving container assembly 504 includes inlet connectors 514 that include a flexible tube. Inlet connector 514 is welded within fluid inlet 486. Barbed stem 508 which is more rigid than connector 514 is then pressed into the opposing end of connector 514 so as to form a fluid tight seal therebetween. In yet other alternative embodiments, it is appreciated that any number of different tubes, couplers, and other types of connections can be used to form liquid tight fluid connections between manifold 502 and receiving container assemblies 504.

Figure 26:
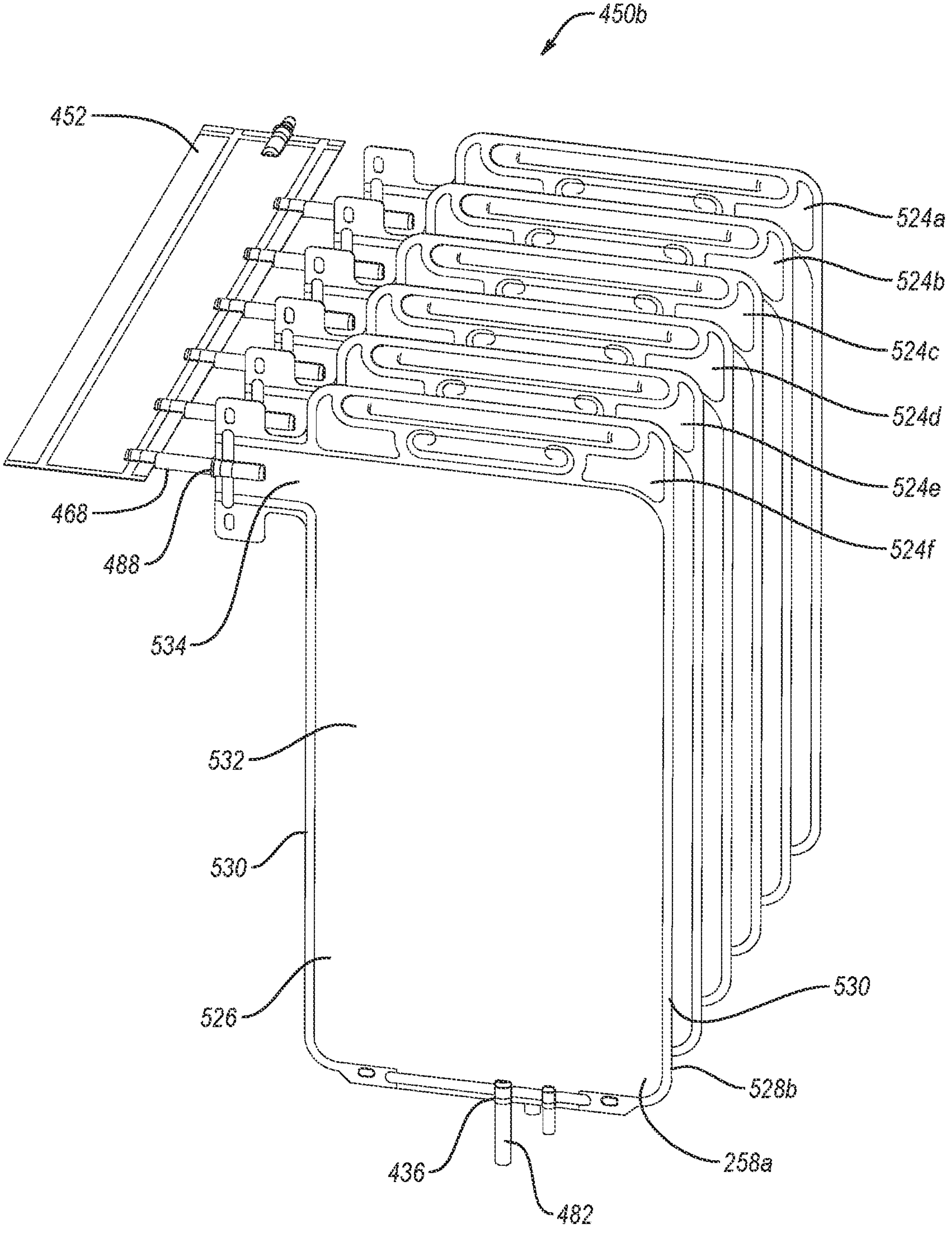
FIG. 26 is a further alternative embodiment of the fluid manifold system shown in FIG. 22 wherein only single receiving containers are connected to the manifold.

Depicted in FIG. 26 is a fluid manifold system 450*b*. Like elements between fluid manifold systems 450 and 450*b* are identified by like reference characters. Fluid manifold system 450*b* includes manifold 452 as previously discussed. However, in contrast to using receiving container assemblies 454, manifold system 450*b* includes single receiving containers 524*a-f* that are fluid coupled with manifold 452. Each receiving container 524 includes a flexible body 526 comprised of overlaying sheets 528*a* and 528*b*. The sheets 528*a* and *b* are welded together to form seam lines 530 that bound a compartment 532. Compartment 532 has a fluid inlet 534 formed between sheets 528*a* and *b* and a fluid outlet 536 disposed at the opposing end of body 526. Inlet connector 488 is welded or otherwise secured to body 524 so as to communicate with fluid inlet 534. Inlet connector 488 is selectively coupled with outlet connector 468 to provide sealed fluid communication between manifold 452 and receiving container 524. Once a receiving container 524 is filled with a fluid to a desired level, fluid inlet 534 is sealed closed by welding sheets 528A and B together across fluid inlet 534. Receiving container 524 can then be separated from manifold 452 by cutting across the sealed fluid inlet 534. Each receiving container 524*a-f* can be filled sequentially using substantially the same process as previously discussed with regard to fluid manifold system 450, i.e., individual receiving containers can be filled by moving clamps along the length of manifold 452. The above discussion discloses a number of different embodiments of fluid manifold systems. In still other embodiments, it is appreciated that the different manifolds, connectors, receiving containers and other parts can be mixed and matched. In addition, different connectors can be used to establish fluid communication between the manifold and the receiving containers.

The inventive fluid manifold systems disclosed herein have a number of unique benefits over the prior art. By way of example and not by limitation, because the receiving containers and/or manifolds can be formed from overlapping polymer sheets that are welded together, the manifold systems are easy to manufacture to desired specifications. The manifold systems also decrease the number of separate connections required and thereby decrease the risk of leaking and contamination while lowering assembly time. As previously discussed, the manifold systems also minimize the amount of gas that is pushed from the manifold into the receiving containers while making it easy to strip any remaining fluid within the manifold into a receiving container.

Another benefit of the inventive manifold systems is that they can be manufactured with a fewer number of different fluid contact surfaces. In traditional manifold systems, the receiving containers are separated from the manifold, which is comprised of tubing and connectors, by heat sealing and cutting the tube extending from the receiving container. Effective heat sealing of the tubing, however, typically required that the tubing be made of a different material than the receiving containers. In contrast, the receiving containers of the present invention are separated from the manifold by sealing and cutting overlapping sheets of the receiving container. In this configuration, because tubing or tubular connectors are not being heat sealed, the manifolds, connectors, and receiving containers of the manifold system can be made with the same fluid contact surface, thereby minimizing the risk of unwanted leaching of material into the fluid being processed.

Furthermore, because the inventive manifold systems reduce the number of cut tubing sections that are used, there is less risk for any particulate from the cut tubing entering the fluid. Likewise, the inventive manifold systems are more easily managed than traditional systems in that the inventive systems can be configured for mounting on a support rack or organized and secured to other surfaces.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method of manufacturing a manifold system for dispensing a fluid, the method comprising:

positioning a first flexible sheet on top of a second flexible sheet;

welding the first flexible sheet to the second flexible sheet so as to form a fluid flow path therebetween, the fluid flow path comprising a primary flow path communicating with a fluid inlet and a plurality of spaced apart secondary flow paths that branch off of the primary flow path; and securing a plurality of tubular connectors directly to the first flexible sheet and the second flexible sheet so that each tubular connector communicates with a corresponding one of the secondary flow paths.

2. The method as recited in claim 1, wherein each secondary flow path has a diameter that is smaller than a diameter of the primary flow path.

3. The method as recited in claim 1, further comprising securing the plurality of tubular connectors to the first flexible sheet and the second flexible sheet with adhesive or welding.

4. The method as recited in claim 1, further comprising securing a plurality of receiving containers to the tubular connectors, wherein each receiving container is secured to a respective tubular connector.

5. The method as recited in claim 4, further comprising sterilizing the manifold system and the receiving containers.

6. The method as recited in claim 1, wherein each tubular connector comprises a port or tube.

7. The method as recited in claim 1, wherein the opposing flexible sheets of the first manifold comprise sheets of polymeric film.

8. The method as recited in claim 7, wherein the opposing flexible sheets have a thickness in a range between 0.1 mm to about 5.0 mm.

9. The method as recited in claim 1, wherein the welding the first flexible sheet to the second flexible sheet includes heat welding, RF energy welding, and ultrasonic welding techniques.

10. The method as recited in claim 1, further comprising positioning aligning holes on the first and second flexible sheets to aid in alignment thereof during manufacturing of the manifold system.

11. A method of manufacturing a manifold system for dispensing a fluid, the method comprising:

positioning a first flexible sheet on top of a second flexible sheet;

welding the first flexible sheet to the second flexible sheet so as to form a fluid flow path therebetween, the fluid flow path comprising a primary flow path communicating with a fluid inlet and a plurality of spaced apart secondary flow paths that branch off of the primary flow path, each of the secondary flow paths communicating with a corresponding fluid outlet; and securing a plurality of aseptic connectors to the fluid outlet so that each aseptic connector communicates with a corresponding one of the secondary flow paths, wherein the fluid outlet is comprised of the first flexible sheet and the second flexible sheet and each aseptic connector of the plurality of aseptic connectors is secured directly to the first flexible sheet and the second flexible sheet.

12. The method as recited in claim 11, further comprising securing a receiving container to each of the aseptic connectors.

13. The method as recited in claim 12, further comprising securing a first mating portion of the aseptic connector to the fluid outlet and securing a second mating portion of the aseptic connector to the receiving container.

14. The method as recited in claim 13, wherein the first and second mating portions are sealed.

15. The method as recited in claim 13, further comprising fluidly attaching the manifold system to the receiving container by securing the first mating portion to the second mating portion.

16. The method as recited in claim 13, further comprising allowing for fluid communication between the manifold system and the receiving container by removing a seal on the first and second mating portions.

17. The method as recited in claim 12, further comprising sterilizing the manifold system and the receiving containers.

18. The method as recited in claim 11, further comprising connecting a fluid coupler to each of the fluid outlets, wherein the plurality of aseptic connectors each comprise a fluid coupler.

* * * * *